US010293884B2

(12) United States Patent
Feuerstein et al.

(10) Patent No.: US 10,293,884 B2
(45) Date of Patent: May 21, 2019

(54) BICYCLE ELECTRICAL CONTROL DEVICE AND SYSTEM

(71) Applicant: SRAM, LLC, Chicago, IL (US)

(72) Inventors: Paul Feuerstein, Brookfield, IL (US); Andrew Schumacher, Chicago, IL (US); Joshua Brown, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 598 days.

(21) Appl. No.: 14/830,608

(22) Filed: Aug. 19, 2015

(65) Prior Publication Data

US 2017/0050701 A1 Feb. 23, 2017

(51) Int. Cl.
| | |
|---|---|
| *B60K 17/04* | (2006.01) |
| *B60K 17/12* | (2006.01) |
| *B62M 25/08* | (2006.01) |
| *B62K 23/02* | (2006.01) |
| *H01H 13/06* | (2006.01) |
| *H04W 4/70* | (2018.01) |

(52) U.S. Cl.
CPC ............ *B62M 25/08* (2013.01); *B62K 23/02* (2013.01); *H01H 13/06* (2013.01); *H04W 4/70* (2018.02)

(58) Field of Classification Search
CPC ........ B62M 25/05; B62K 23/02; H01H 13/06
See application file for complete search history.

(56) References Cited

U.S. PATENT DOCUMENTS

| | | | | |
|---|---|---|---|---|
| 2008/0210046 A1* | 9/2008 | De Perini | ............... | B62K 23/02 74/502.2 |
| 2009/0315692 A1* | 12/2009 | Miki | ................. | B62K 23/02 340/432 |
| 2013/0276568 A1 | 10/2013 | Burato et al. | | |
| 2013/0292235 A1* | 11/2013 | Baum | ................. | H01H 13/06 200/302.2 |

FOREIGN PATENT DOCUMENTS

| | | |
|---|---|---|
| DE | 202011004673 U1 | 7/2011 |
| EP | 1 932 754 B1 | 6/2008 |
| EP | 2082953 | 7/2009 |
| EP | 2594471 | 5/2013 |
| EP | 2594471 A1 | 5/2013 |
| TW | 200932619 A | 8/2009 |

OTHER PUBLICATIONS

"Mechtronic", Mavic, 1999.

* cited by examiner

*Primary Examiner* — Jake Cook

(57) ABSTRACT

A control device may be configured so as to be integrated, or coupled, with a bicycle to control bicycle components. The control device may also be integrated with other control devices and system components to control bicycle components. The control device may interface with electromechanically controlled bicycle components so as to trigger an action when actuated. The control device may be dimensioned so as to have a mating surface contoured to matingly engage with a mounting surface of a bicycle, such as on a handlebar. The control, device may also be dimensioned so as to have a compact and/or concealed appearance aided by (Continued)

a low profile relative to the bicycle mounting surface selected for the control device. The control device may be configured such that the control device is protected from actuation from unintended or other user inputs.

27 Claims, 18 Drawing Sheets

BICYCLE ELECTRICAL CONTROL DEVICE AND SYSTEM

BACKGROUND

Traditional hand actuated control devices such as shifters and/or brake levers for bicycles and other handlebar-steerable vehicles may include levers and/or other mechanisms attached to handlebars of a bicycle. These mechanisms are configured to control various types of mechanical or electromechanical bicycle components, such as drive system components, braking components, and/or suspension components. Traditional levers or other devices may be specifically designed for particularly configured handlebar orientations and/or particular placement within a handlebar orientation. Further, the traditional mechanisms may include bulky parts or assemblies are not easily placed in alternate positions throughout handlebar orientations, or in other locations of the bicycle.

SUMMARY

According to one aspect, an electrical control device for a bicycle comprises a control mechanism for generating a control signal to control a bicycle component. A rigid protective housing is configured to surround the control mechanism. The rigid protective housing has an opening. A cover extends across the opening and is configured to displace into the opening to engage the control mechanism to generate the control signal.

According to another aspect, a control device assembly for a bicycle comprises an electrical control device including a control mechanism for generating a control signal to control a bicycle component. A rigid protective housing is configured to surround the control mechanism. The rigid protective housing has an opening. A cover extends across the opening. The cover is configured to displace into the opening to engage the control mechanism to generate the control signal. The control device includes securing features. A coupler is configured to be attached to a bar end of a bicycle handlebar. The coupler having a gripping surface and a control, device securing part dimensioned to receive the securing features of the control device.

According to another aspect, a bicycle control system comprises at least one electrical control device comprising a control mechanism for generating a control signal to control at least one bicycle component. A rigid protective housing is configured to surround the control mechanism. The rigid protective housing has an opening. A cover extends across the opening and is configured to displace into the opening to engage the control mechanism to generate the control signal. A receiver is communicably coupled to the at least one control device by at least one cable. The at least, one control device is configured to communicate the control signal to the receiver when the control mechanism is engaged. The receiver is configured to wirelessly communicate the action to the at least one bicycle component.

BRIEF DESCRIPTION OF DRAWINGS

Other aspects and ad vantages of the embodiments disclosed herein will become apparent upon consideration of the following detailed description, wherein similar or identical structures have similar reference numerals.

DETAILED DESCRIPTION

A control device may be configured so as to be integrated, or coupled, with a bicycle to control bicycle components. The control device may interface with electromechanically controlled bicycle components so as to trigger an action when actuated. The control device may be dimensioned so as to have a mating surface contoured to matingly engage a tubular or otherwise curved surface of a bicycle, such as on a handlebar. The control device may also be dimensioned so as to have a compact and/or concealed appearance aided by a low profile relative to the bicycle mounting surface selected for the control device. For example, a communication wire integrated with the control device may be offset from an apex of a curved mating or mounting surface of the control device so as to facilitate a reduction of a height dimension of the control device. The control device may be configured such that the control device is protected from actuation from unintended or other user inputs. For example, the control device may include a protective housing that surrounds a control mechanism of the control device. The housing may include an opening through which a user may actuate the control device. Further, the actuating position of the control mechanism of the device may be located within the housing. For example, the actuation position may be below a plane formed by the opening of the housing. As such, actuation of the control mechanism from alternate directions or axes may be precluded. Further, the housing may also include protrusions, tabs, or other securing features that may be used to secure the control device to the bicycle. The control device may be used with other control devices and/or a receiver to control bicycle components.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

Figure 1:
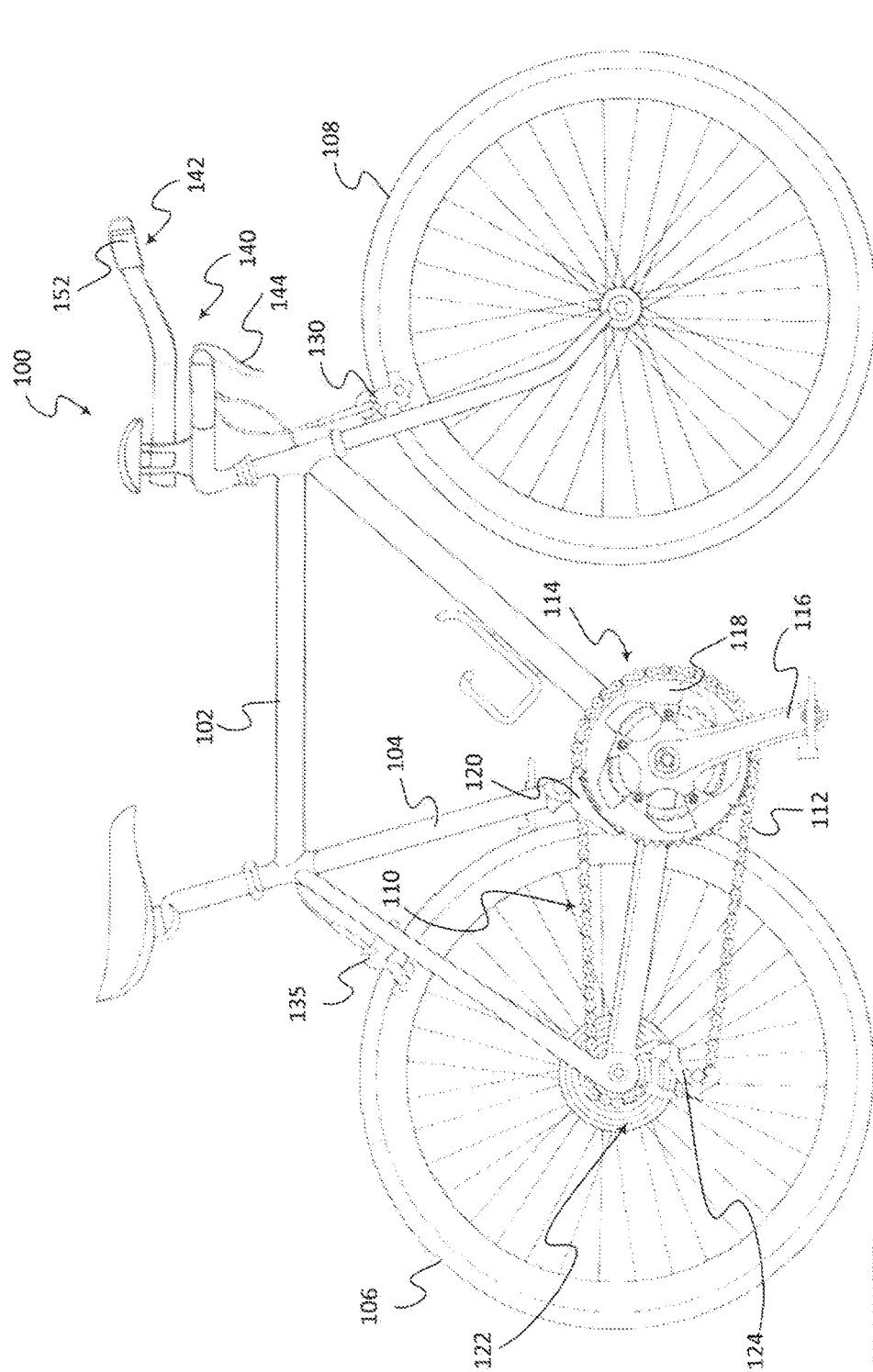
FIG. 1 is a right side elevational view of a bicycle according to one embodiment.

FIG. 1 generally illustrates a bicycle 100, which may be used to implement one or more electrical control device assemblies and one or more electrical control devices disclosed herein. The bicycle 100 includes a frame 102, front and rear wheels 108, 106 rotatably attached to the frame 102, and a drivetrain 110. A front brake 130 is provided for braking the front wheel 108 and a rear brake 135 is provided for braking the rear wheel 106. The drivetrain 110 includes a chain 112, a front crank assembly 114 including a crank 116, one or more chainrings 118, a front derailleur 120 attached to a seat tube 104 of the frame 102, a rear sprocket assembly 122 coaxially mounted to the rear wheel 106 and a rear derailleur 124. The drivetrain 110 involves electromechanical operation of the front derailleur 120 and/or the rear derailleur 124. In an embodiment, the drivetrain may involve only a single front chainring 118, and as such may not include the front derailleur 120.

A handlebar assembly 140 is attached to the frame 102 for user, or rider, control of the bicycle 100. The handlebar assembly may include an electrical control device assembly 142 which includes a control, device coupler 152 and an electrical control device 150. One or more control device assemblies 142 and/or control devices 150 may be used with the bicycle. The control devices are configured to actuate or otherwise control components of the bicycle 100. For example, the control device 150 may be configured to control gear shifting of the front derailleur 120 and/or the rear derailleur 124. The control device 150 may also be configured to control characteristics of a suspension system (not shown). The handlebar assembly 140 may also include a brake lever 144 that is configured to operate the front brake 130. The rear brake 135 is operated by a brake lever (not shown) also located on the handlebar assembly 140.

While the illustrated bicycle 100 is a road bike, the present disclosure has applications to bicycles of any type, including fully or partially suspensioned mountain bikes and others, as well as bicycles with mechanical (e.g. cable, hydraulic, pneumatic) and non-mechanical (e.g. wired, wireless) drive systems. For example, the illustrated handlebar assembly 140 involves an aero-bar configuration, however, the control device 150 and/or control device system 142 may be used with other types of handlebar assemblies as well, such as drop bars, bullhorn bars, riser bars, or any other type of bicycle handlebar. Also, while the embodiments described herein describe control devices attached to handlebars, a person having experience in the art would recognize the possible positioning of control devices 150 at other areas of a bicycle, such as locations throughout the frame 102.

It is to be understood that the specific arrangement and illustrated components of the frame 102, front wheel 108, rear wheel 106, drivetrain 110, front brake 130, and rear brake 135 are nonlimiting to the disclosed embodiments. For example, while the front brake 130 and the rear brake 135 are illustrated as hydraulic rim brakes, hydraulic disc brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof such as suspension systems, are contemplated and encompassed within the scope of the present disclosure.

Figure 2A:
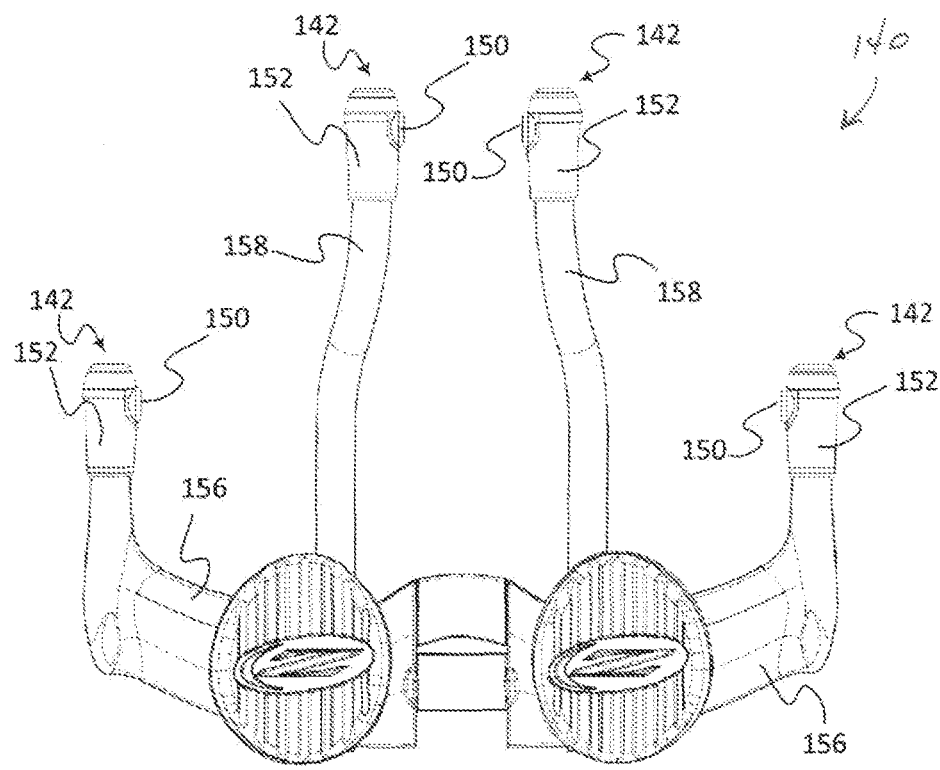
FIGS. 2A-2B are top views of a handlebar assembly of FIG. 1 including embodiments of electrical control device assemblies and electrical control devices.
Figure 2B:
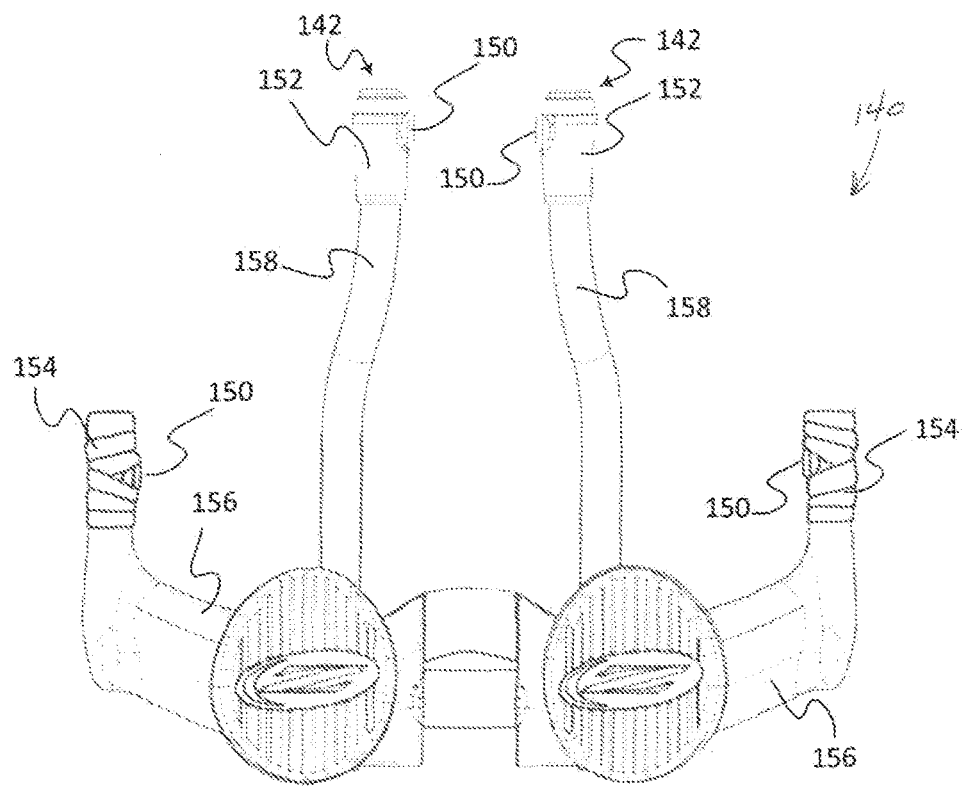

FIGS. 2A and 2B are top views of the handlebar assembly 140 of FIG. 1, which include embodiments of the control device assembly 142 and the control device 150. The handlebar assembly 140 as shown is as an aero-bar assembly which includes aerodynamic extensions 158 and base bars 156. The control device assemblies 142 include the control device 150 and the control device coupler 152. In an embodiment, the control device assembly 142 may a bicycle grip assembly including a gripping surface 192.

In FIG. 2A, the handlebar assembly 140 includes control device assemblies 142 disposed at bar ends of the aerodynamic extensions 158 and the base bars 156. In FIG. 2B, the control device assembly 140 is shown disposed at the bar ends of the aerodynamic extensions 158, while the base bars 156 have the control device 150 attached with handlebar gripping tape 154. The handlebar gripping tape 154 is wrapped securely around the perimeter of the control device 150, thus applying a force to the radial, and possibly vertical, perimeter of the control device 150. The handlebar gripping tape 154 may also be wrapped over the control device 150, thus covering the control device 150 and applying an axial force to the control device 150.

In an embodiment, a control mechanism 220 of the control device 150 has an actuation location that is internal to the control device 150. For example, the control device 150 may include a protective housing 210 or other structure that precludes actuation of the control mechanism 220 from forces applied to the control device 150 in radial, transverse, and/or vertical directions not aligned with an actuation axis of the control device 150. For example, the protective housing 210 may include a collar 211 that surrounds the control mechanism 220. The collar 211 may have an opening 218 at the top which protects against actuation from forces applied at the edges of the control device 150 as well as forces applied or distributed across the top of the control device 150, such as would result from covering or otherwise securing the control device 150 with handlebar gripping tape 154. In an embodiment, the actuation location may be below a plane defined by a top surface of the control device 150 that includes an actuation surface 162.

In an embodiment, the protective housing 210 may include securing features that facilitate attachment to the bicycle. For example, the securing features may include securing protrusions 168 disposed on the protective housing 210. The gripping tape 154 may be wrapped over the protrusions 168 to secure the control device 150 to the bicycle. The protective housing 210 may also include a mating surface 216 that is contoured to matingly engage a mounting surface of the bicycle. Also, or alternatively, the protective housing 210 of the control device 150 may be configured to integrate with the control device coupler 152. As such, both control mechanism protection and bicycle integration may be achieved using features and characteristics of the protective housing 210.

Figure 3:
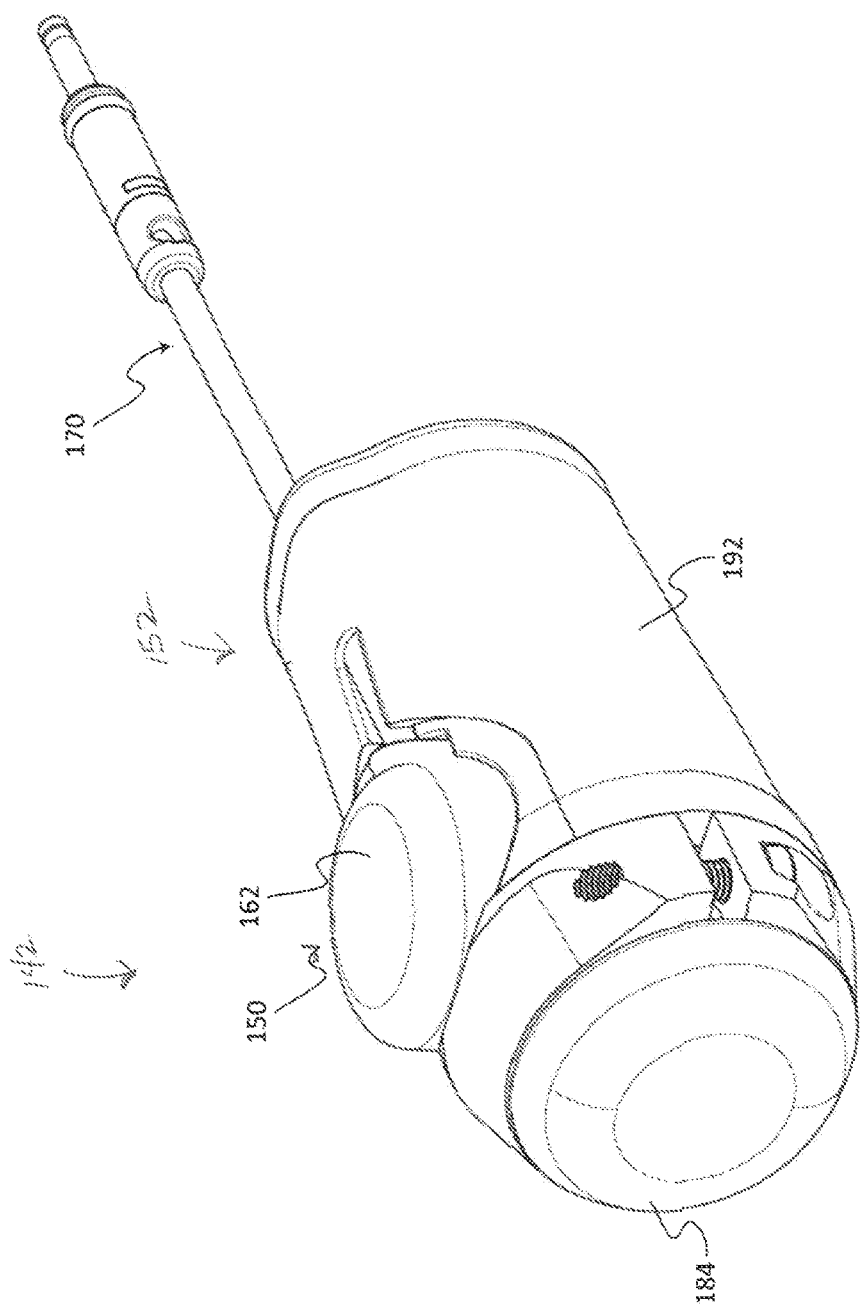
FIG. 3 is a perspective view of an embodiment of an electrical control device assembly.

FIG. 3 is a perspective view of an embodiment of the control device assembly 142 which may be used with the bicycle 100 of FIG. 1 and/or the handlebar assembly 140 of FIGS. 2A and 2B. The control device assembly 142 includes the control device 150, which as shown includes the actuation surface 162 and a cable assembly 170. The control device assembly 142 may also include the coupler 152. In the illustrated embodiment, the control device assembly 142 is a bicycle grip assembly. The coupler 152 includes the gripping surface 192. Also, the coupler 152 may include an end cap 184 and is configured for use on a bar end. For example, the coupler 152 may be installed over the bar end. The coupler 152 may also be configured for installation over a bar, but inboard of the bar end, for example if the end cap 184 is not included. As can be seen from the illustrated embodiment, the control device 150 may be integrated with the coupler 152 such, that a secure attachment is achieved with the actuation surface 162 in an accessible orientation.

Figure 4:
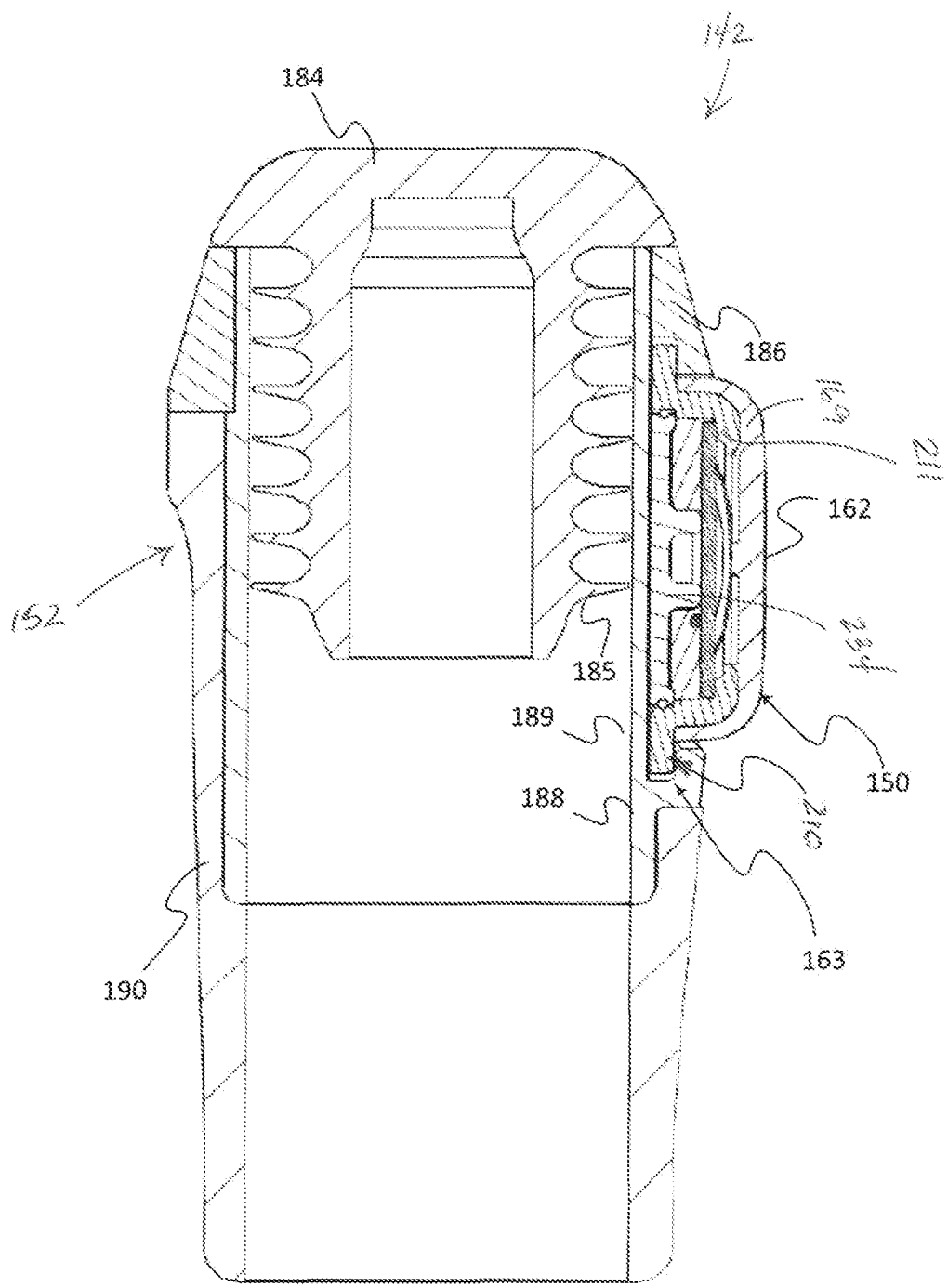
FIG. 4 is a sectional view of the control device assembly of FIG. 3.

FIG. 4 is a sectional view of the control device assembly 142 of FIG. 3, and illustrates the secure attachment of the control device 150 to the coupler 152 using a particularly configured securing interface 163. The control device assembly 142 includes an end cap 184, a fastening ring 186, a control device securing part 188, a gripping part 190, and the control device 150. The securing interface 163 includes the control device securing part 188 that interfaces and secures the control device 150 using securing features paired to the external surfaces and/or features of the control device housing 210.

Upon installation over a bar, a bar surface may be positioned to mate or otherwise contact an internal surface 189 of the coupler 152. Further, with the use of hollow bars, a bar wall may be positioned between the internal surface 189 and securing ridges 185 of the end cap 184

Figure 5:
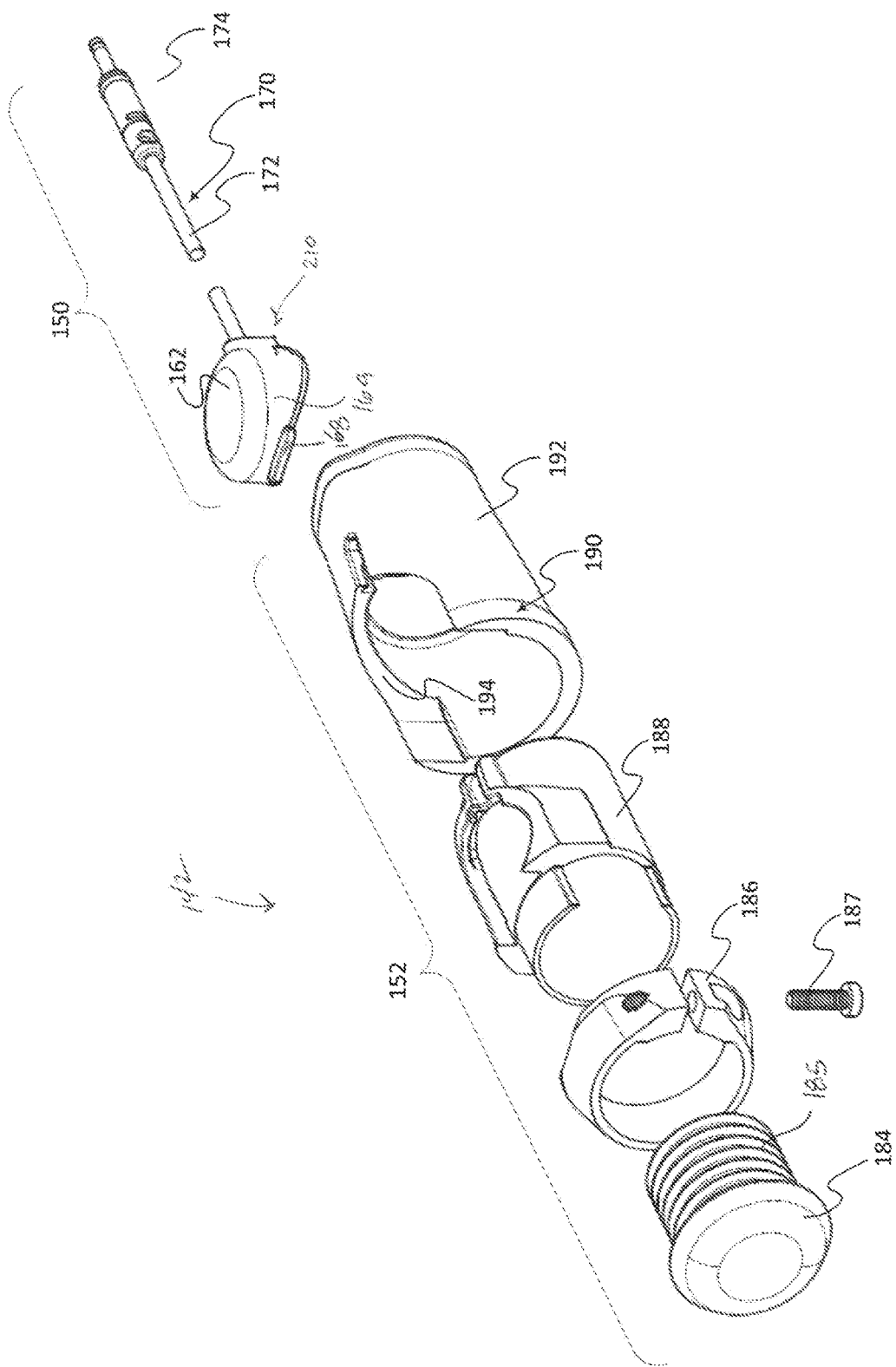
FIG. 5 is an exploded view of the control device assembly of FIG. 3.

FIG. 5 is an exploded view of the control device assembly 142 shown in FIG. 3. The control device assembly 142 includes the coupler 152 and the control device 150. In this embodiment, the coupler 152 includes the end cap 184, the fastening ring 186, the control device securing part 188, and the gripping part 190. The fastening ring 186 is secured to the control device securing part 188 and/or the bicycle using a fastener 187. The gripping part 190 includes a gripping surface 192 and a securing part receiving portion 194. The securing part receiving portion 194 is coupled to the securing part 188. The control device securing part 188 includes securing features paired, with the external surface of the control device 150. The fastening ring 186 may also include securing features paired with the external surface of the control device 150. The control device 150 includes the actuation surface 162 on a cover 169, the protective housing 210 and a cable assembly including a cable 172 and a connector 174, as well as other components that will be described further below. In an embodiment, the control device 150 may not include the cable assembly 170.

Figure 12A:
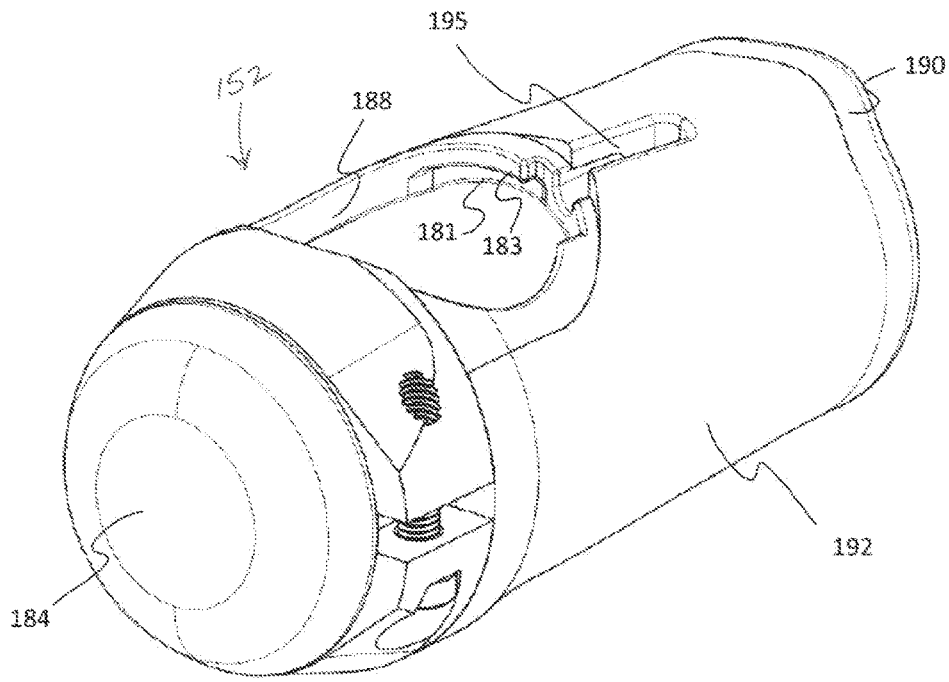
FIGS. 12A-12B are views of the coupler of FIG. 3 and/or FIG. 4.
Figure 12B:
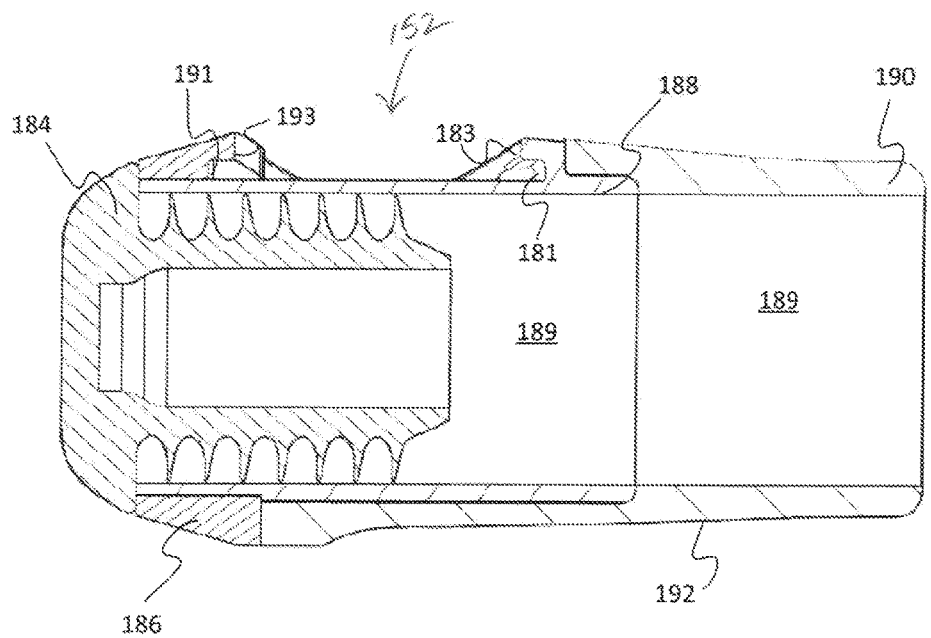

FIGS. 12A-12B are views of the coupler 152 of the control assembly 142. The coupler 152 includes the end cap 184, the fastening ring 186, the control device securing part 188, and the gripping part 190. The control device securing part 188 also includes securing features 181, 183 that are configured to interact with securing features of the control device 150, such as the securing tabs or protrusions 168 of FIG. 6, to attach the control device 150 to the coupler 152. The securing features may include a lip 183 and an associated recess 181 sized and dimensioned to receive the securing protrusions 168 of the control device 150. The fastening ring 186 may also have securing features such as a lip 193 and an associated recess 191 sized and dimensioned to receive the securing protrusions 168 of the control device 150.

The gripping part 190 may be made of a different less rigid material than the control device securing part 188. For example the control device securing part 188 may be formed of polypropylene or glass filled polypropylene, and the gripping part 190 may be formed of santoprene or santoprene TPV. As such, the gripping portion 190 may provide a gripping surface 192 that is more ergonomically oriented for gripping by a bicycle rider during use. The control device securing part 188 may be attached to the gripping part 190 using any technique. For example, the gripping part 190 may be over-molded onto, or co-molded with, the control device securing part 188.

The coupler 152 may be hollow, and have an internal diameter that is configured to fit over a bar end of a bicycle. Internal surfaces of the control device securing part 188 and the gripping part 190 may combine to form an interface surface 189 with an external surface of the bar end. As such, the coupler 152 is configured to attach to a bicycle by fitting over a bar end of the bicycle. The coupler 152 may be further configured to secure to a bar end using the fastening ring 186. In an embodiment, the coupler 152 may not include the end cap 184. For example, the coupler 152 may be configured to fit over a bar of a bicycle, but inboard of the bar end, leaving the bar end available for potential other device attachment. The coupler 152 may also include an integrated cable channel 195. The cable channel 195 receives the cable 172 of the control device 150, and provides a passage wholly or partly concealed by the gripping surface 192.

The control device 150 may be installed into the coupler 152 by inserting the cable 172 of the control device 150 into the cable channel 195, then inserting the securing protrusions 168 of the control device 150 in the recess 181 of the device securing part 188 and the recess 191 of the fastening ring 186. The fastening ring 186 may then be tightened to secure the control device 150 to the coupler 152 and/or secure the coupler 152 to the bicycle.

Figure 6:
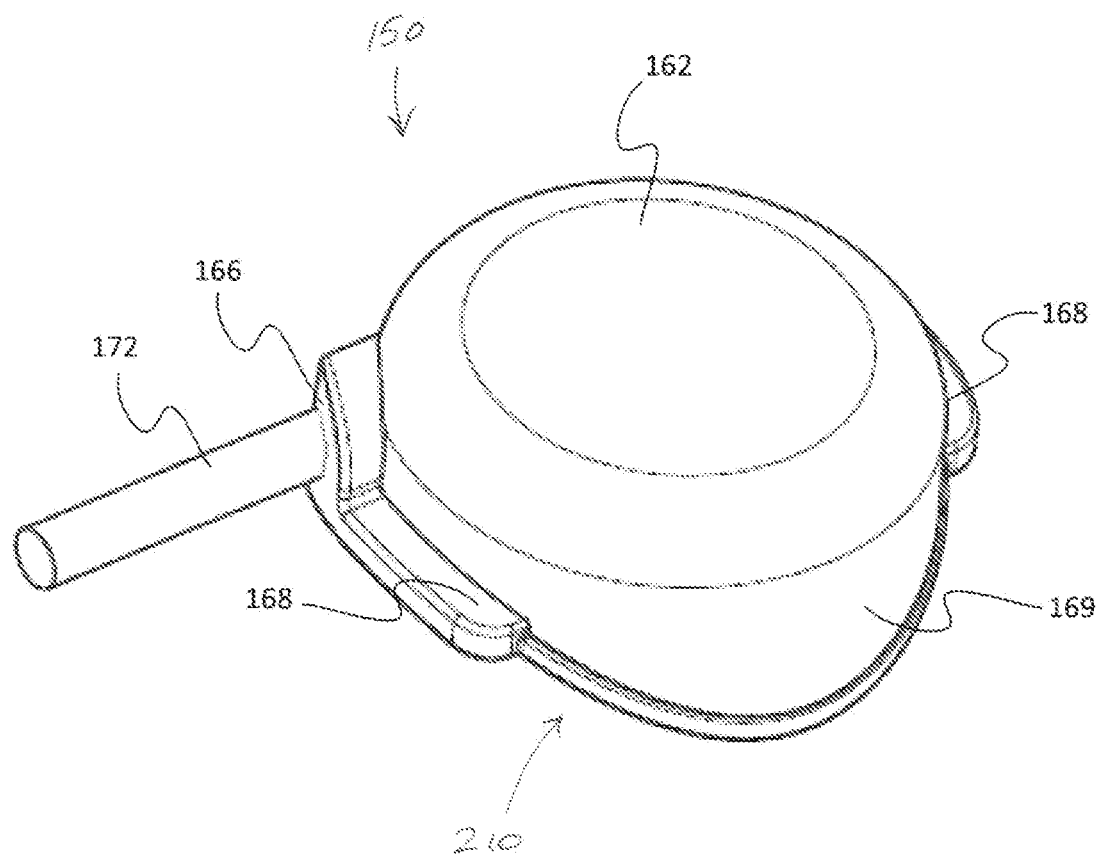
FIG. 6 is a perspective view of an electrical control device of the control device assembly of FIG. 3.
Figure 7:
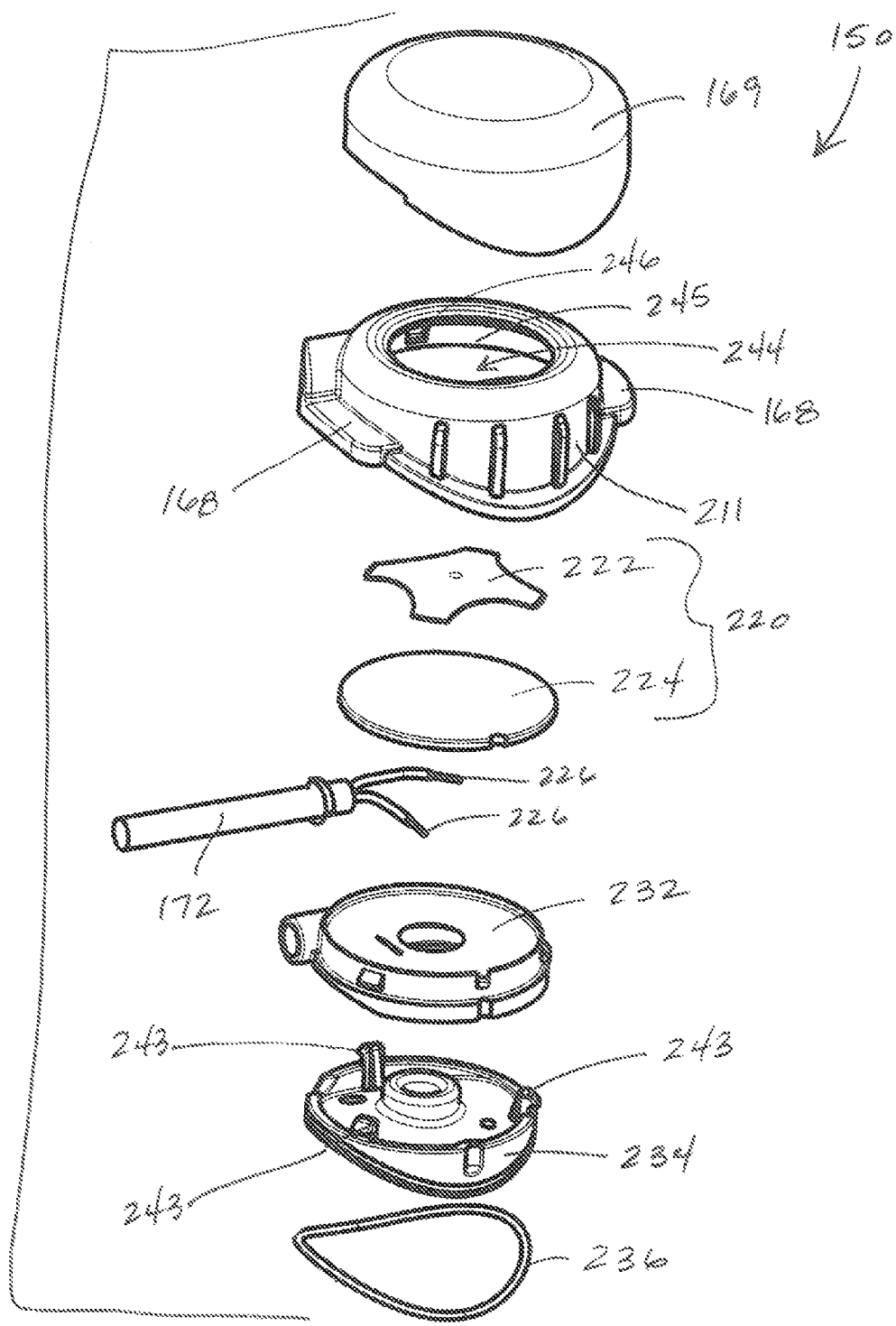
FIG. 7 is an exploded view of the control device of FIG. 6.

FIGS. 6 and 7 are views of an embodiment of the control device 150. The control device 150 includes the actuation surface 162 on the control device cover 169 as well as a protective housing 210 that includes a collar 211 having a cable receiving portion 166 and the securing protrusions 168. The protective housing 210 is at least partially covered by the control device cover 169 such that an opening 218 in the protective housing 210 that corresponds with the actuation surface 162 is concealed and/or enclosed by the control device cover 169. Also, an internal control mechanism of the control device 150 may be hydraulically and/or pneumatically sealed such that it is protected from an external environment of the control device 150.

In an embodiment, the electronic or electrical control device 150 is for a bicycle and includes a control mechanism 220 for generating a control signal to control a bicycle component. The control device 150 also includes the rigid protective housing 210 configured to surround the control mechanism 220. The rigid protective housing 210 includes the collar 211 and a base 234. The collar 211 includes the opening 218. The control device 150 also includes the cover 169 extending across the opening 218. The cover 169 is configured to displace into the opening 218 to engage the control mechanism 220 to generate a control signal to control the bicycle component. For example, in an embodiment the actuation surface 162 of the cover 169 may be made of a flexible material and the cover 169 may be configured to deform into the interior of the collar 211 when the actuation surface 162 is depressed. In an embodiment, the cover 169, including the actuation surface 162, may be made of a single material. For example, the cover 169 and/or the actuation surface 162 may be made of a thermoplastic elastomer, such as a santoprene thermoplastic vulcanizate ("Santoprene TPV"). Other materials may also be used. For example, a protrusion 212 (see FIG. 8) made of a rigid material, such as polypropylene, may be attached to the underside of the cover 169, and configured such that the protrusion 212 actuates the control mechanism 220 when the actuation surface 162 is depressed. The cover 169 may cover most, or at least a portion of the rigid protective housing 210 beyond the opening 218. The cover 169 may also form a seal with the rigid protective housing 210 around the control mechanism 220, for example, by being over-molded onto the protective housing 210.

The control device 150 may be substantially circular. Substantially circular describing a generally circular appearance when viewed from above which may include imperfections to a circular core perimeter of the device due manufacturing processes or other reasons, as well as the inclusion of securing protrusions 168 and/or the cable receiving portion 166. In other embodiments different core perimeter shapes may be provided. For example, oval, rectangular, or polygons having five or more sides may be used.

FIG. 7 is an exploded view of the control device 150 of FIG. 6. The control device 150 includes the cover 169, the protective housing 210, the control mechanism 220, the cable 172 and a sealing ring 236. The protective housing 210 includes the collar 211 and the base 234. An internal area of the control device 150 containing the control mechanism 220 and defined by the collar 211 and the base 234 may be fully or partially filled, or potted, with an epoxy material 232. The epoxy material 232 may fill an internal volume of the control device 150, maintaining the relative position, and assembly of the components, as well as forming a seal with the protective housing 210 and the cover 169 around the control mechanism 220. Such a control device may be an epoxy sealed device. More or fewer components may be included in the control device 150. For example, the control device 150 may not include the sealing ring 236. In the illustrated embodiment the control mechanism 220 involves a switch 222, such as a metal dome switch and a printed circuit board ("PCB") 224. The cable connection 226, or wire ends, of the cable 172 may be mounted to the PCB 224 and sealed with the epoxy material 232 such that depression of the switch 222 results in an electrically conductive connection between wires of the cable 172, thus indicating an actuation of the control mechanism 220.

The PCB 224 may include concentric rings or circles of conductive material. The different conductive concentric rings or circles may be attached to different cable ends 226. The switch 222 is configured such that a portion of the switch 222 is in contact with one of the concentric rings, and an actuating portion of the switch, such as a central dimple, makes contact with a central conductive circle when actuated (i.e. pressed). This actuation completes the circuit through the cable 170, and provides the control signal of the control device 150. In an embodiment, 5-10 newtons of force on the actuation surface 162 is required to press the control mechanism 220 to actuation. The epoxy material 232 may be used to secure and position the control mechanism 220 along an actuation axis 201 in the control device 150. The epoxy material 232 may be an epoxy resin, or other potting material.

The housing base 234 may provide a securing function to the internal components of the control device 150 by securably attaching to the collar 211. The base 234 may thus be made of a rigid material, such as glass filled polypropylene. To secure the base 234 to the collar 211, the base 234 may include hooks 243 dimensioned so as to be received in notches 246 on an interior surface 245 of the collar 211. The sealing ring 236 may provide a connective seal between the base 234 and the collar 211. The sealing ring 236 may be made of any material operative to provide such a seal or allow for otherwise filling a space in an assembly of the base 234 and the collar 211. For example, a thermoplastic elastomer, such as a santoprene TPV may be used. Other materials may also be used.

Figure 8A:
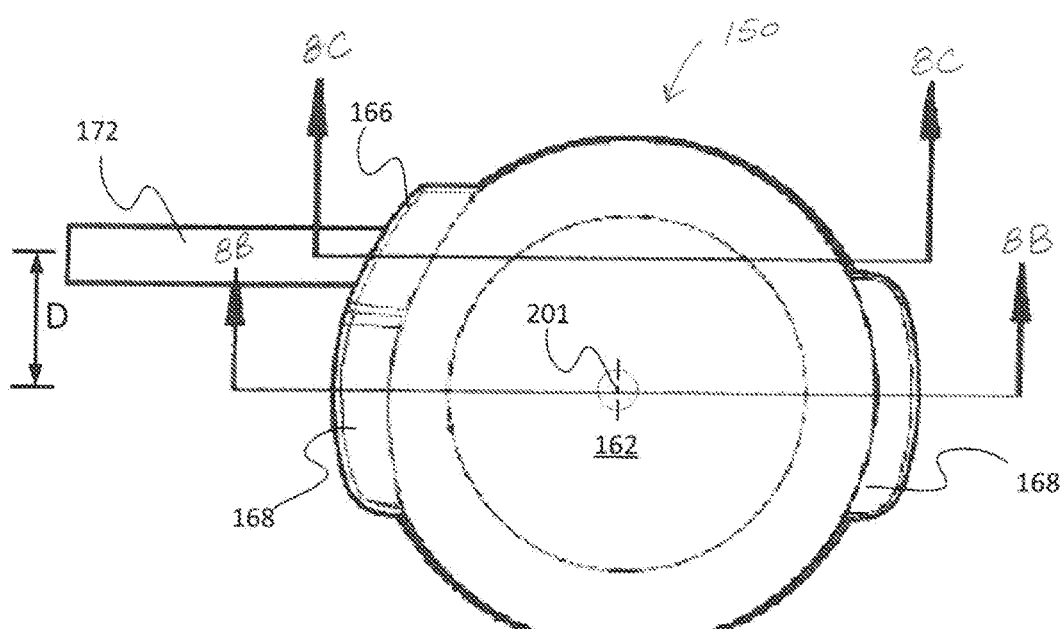
FIGS. 8A-8C are views of the control device of FIG. 6.
Figure 8B:
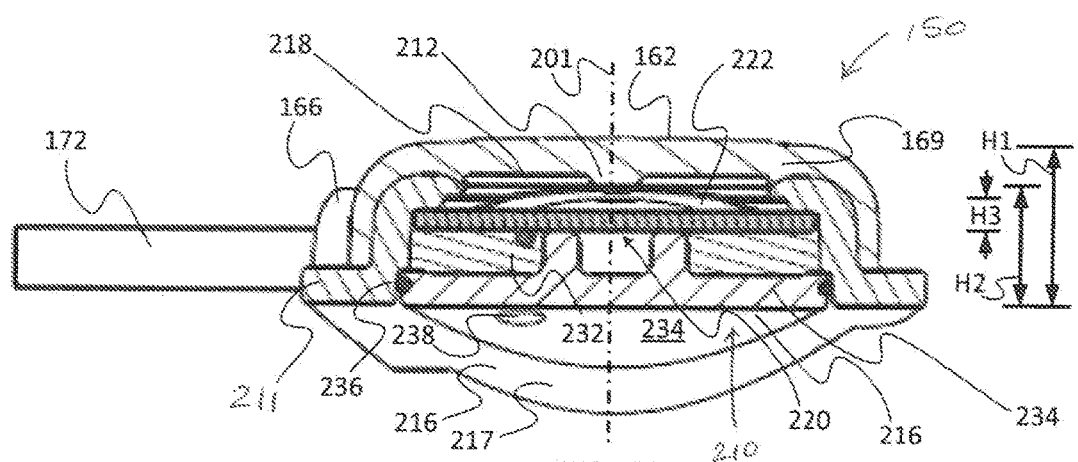
Figure 8C:
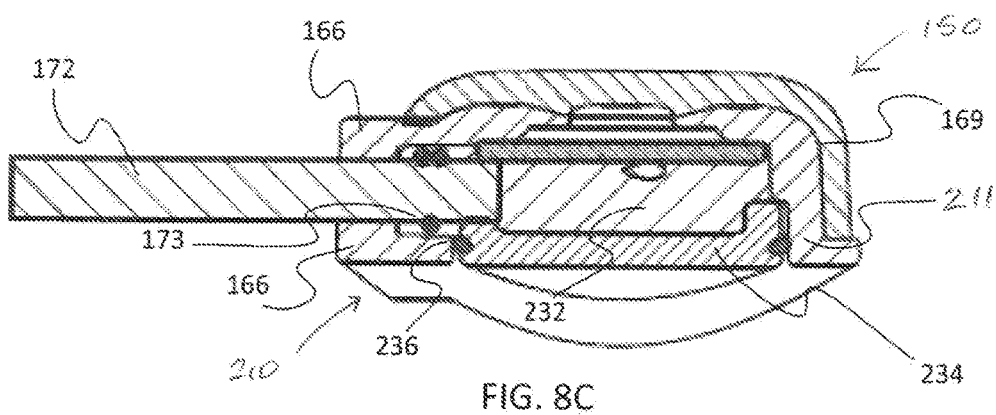

FIG. 8A is a top view of the control device 150 of FIG. 6. FIG. 8B is a cross-sectional view of the control device 150 of FIG. 8A taken along a centerline 8B-8B of the control device 150. FIG. 8C is a cross-sectional view of the control device 150 of FIG. 8A taken along a line 8C-8C that bisects the cable 172 and the cable receiving portion 166 of the control device 150. In this embodiment, the cable receiving portion 166 is offset from the centerline 8B-8B by a distance D.

In FIG. 8B, the cover 169 has the actuation surface 162 that extends across an opening 218 of the housing 210. The cover 169 has the protrusion 212 on the underside of the cover 169. In this configuration, when the cover 169 is depressed in the actuation area 162, the protrusion 212 displaces into the opening 218 and actuates, or engages, the control mechanism 220 through deformation of the switch 222 along the actuation axis 201. The protrusion 212 may be formed of the same material as the cover 169. In an embodiment, the protrusion 212 may be formed of a different material than the cover 169. The different material may be a harder or more rigid material than a material of the rest of the cover 169. For example, the cover 169 may be made mostly of santoprene, but the protrusion 212 may be formed of a polypropylene or glass filled polypropylene. In this example, the actuation surface 162 is flexible and the protrusion 212 is rigid. In the displayed embodiment, the control mechanism 220 has a height H3 along the actuation axis 201 that is less than a height of the protective housing 210 along the actuation axis 201.

The underside of the control device 150 shows a mounting, or mating surface 216 configured, to matingly engage a mounting surface of the bicycle. For example, the mounting surface of the bicycle may be curved and the mounting surface 216 may be contoured to fully or partially match the curve of the bicycle surface. The mounting surface 216 may be made of surfaces of multiple components of the control device 150. For example, the mounting surface 216 may be made of surfaces of the collar 211 and the base 234. The protective housing 210 may have extended sides 217 to provide the mating surface 216 contoured to a mating or mounting surface of the bicycle.

The interface between the base 234 and the collar 211 may be sealed by the sealing ring 236 to prevent the passage of fluid and/or gas through the interface to the internal areas of the control device 150. Also, the interface between the cover 169 and the protective housing 210 may be sealed. The cover/protective housing seal may be formed through any technique. For example, the cover 169 and the protective housing 210 may be sealably attached using an adhesive.

In an embodiment, the cover 169 may be made of a flexible material such as santoprene, and formed through an over-molding process onto the protective housing 210 and a polypropylene based protrusion 212. The control mechanism 220 and the base 234 may be assembled into the collar 211. The PCB 224 of the control, mechanism 220 may be supported or held in position within the control device 150 by the base 234. The epoxy material 234 may be injected into the interior of the control device 150 through one or more holes 238 in the base 234, thus sealing the control mechanism 220 from an external environment FIG. 8C shows the cable 172 secured to the collar 211 at the cable receiving portion 166 by a hog ring 173. The cable 172 is offset from a centerline of the control device 150 by a distance D. The offset of the cable 172 may allow for a shorter height H1 of the control device 150 at the centerline, as is indicated in FIG. 8B. The cable 172 may be any type of cable operable to communicate the control signal generated by the control mechanism 220. For example, the cable 172 may contain two conductive wires of an open electric circuit, and the control mechanism 220 may be operable to close the circuit and generate the control signal as a voltage, current, and/or power communicated through the circuit.

Figure 9A:
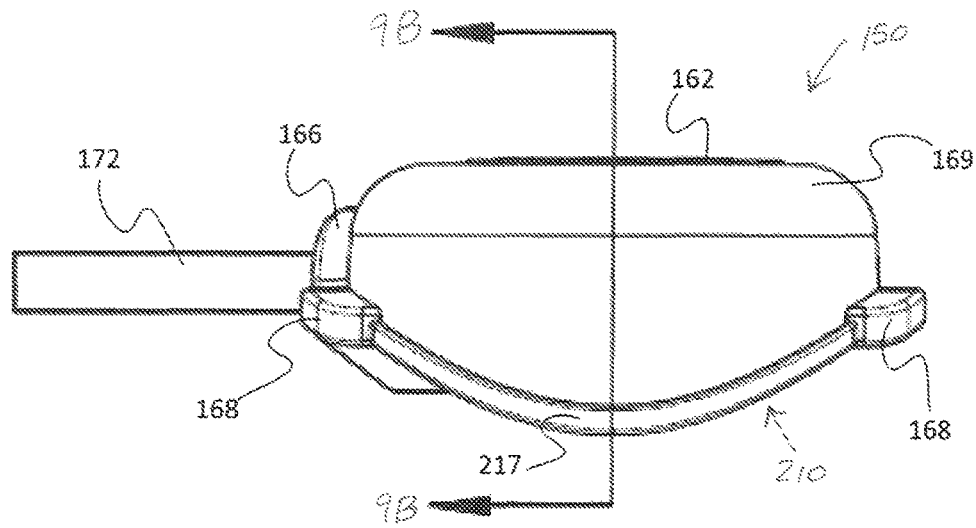
FIGS. 9A-9B are additional views of the control device of FIG. 6.
Figure 9B:
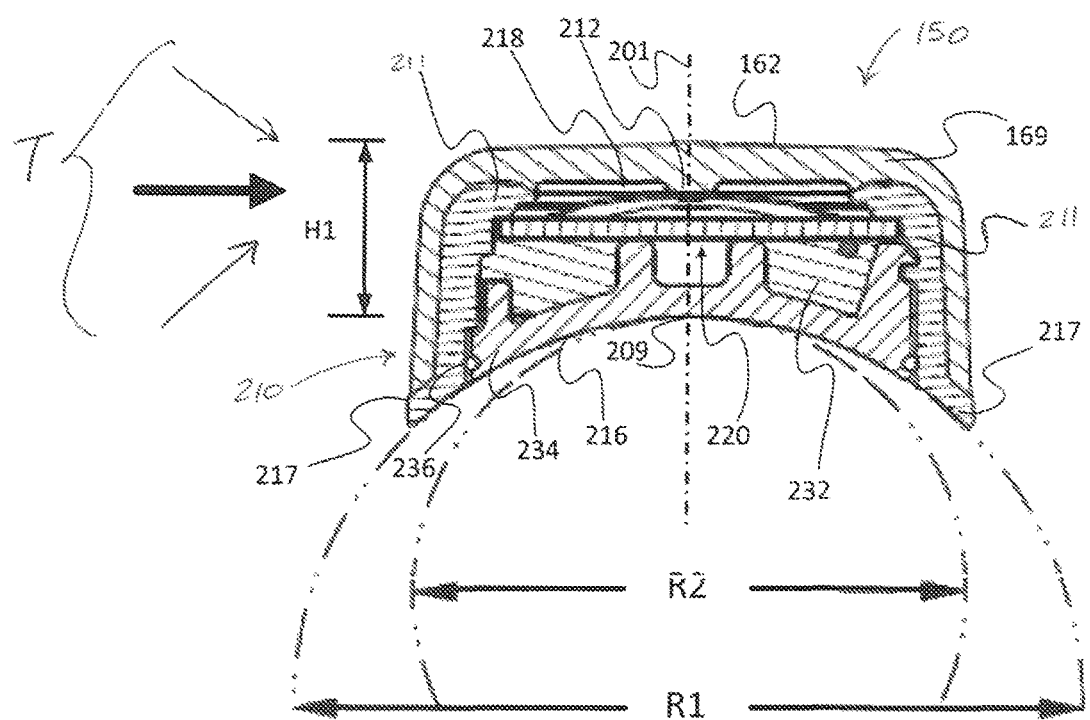

FIG. 9A is a side view of the control device 150 of FIG. 6. FIG. 9B is a cross-sectional view of the control device 150 of FIG. 9A taken along a line 9B-9B. The control device 150 may have the mating or contoured surface 216 at the base of the control device 150. The contoured surface 216 is defined by a curve that allows for mating onto a mounting surface of a bicycle, or another surface. For example, the curve of the contoured surface 216 may be defined by a diameter R1. The diameter R1 may be an external diameter of a bicycle handlebar, such as 32 millimeters. A contoured surface 216 that is defined by a curve having a constant diameter R1 may still be able to accommodate mounting surfaces of a bicycle that have a smaller diameter R2. In an embodiment, the control device 150 may have a mating surface defined by a curve having a diameter R1, and a height H1 defined by a minimum distance along the actuation axis 201 from an apex 209 of the curve of the mating surface to the top of the control device 150, for example the actuation surface 162. In such an embodiment an aspect ratio of the height H1 to the diameter R1 for the control device 150 may be 0.25 or less. For example the height H1 may be 8 millimeters and the diameter R1 may be 32 millimeters, resulting in a 0.25 aspect ratio. The ratio may be even smaller in some embodiments. For example, H1 may be 7 millimeters, resulting in an aspect ratio of 0.21875.

The control device 150 may include the collar 211 oriented so as to surround and protect the control mechanism 220. The collar 211 may protect the control mechanism 220 from inadvertent actuation, such as actuation in transverse or skewed directions T to the control device 150. A transverse direction T may be determined relative to the actuation surface 162. The transverse direction T may be any direction of approach to the control device 150 including any axis passing through the collar 211 prior to reaching the control mechanism 220. For example, a transverse direction T may be along an axis parallel to a plane containing the opening 218 of the collar 211 and between the actuation surface 162 and the mounting surface 216 of the control device 150.

Figure 10A:
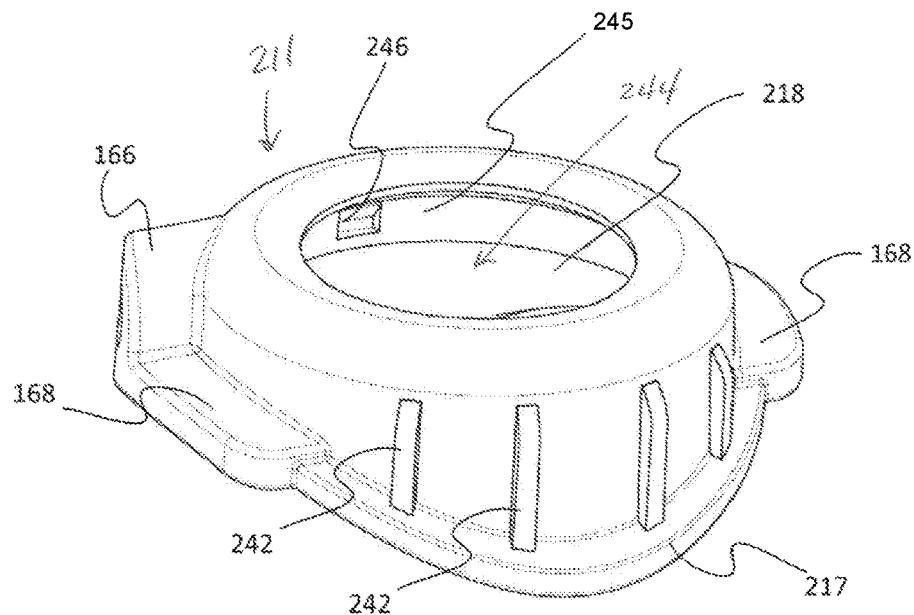
FIGS. 10A-10F are views of a collar of the control device of FIG. 6.
Figure 10B:
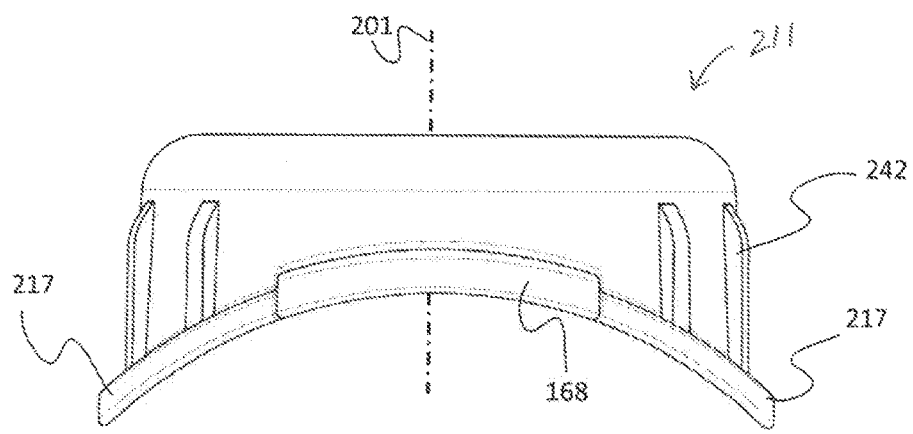
Figure 10C:
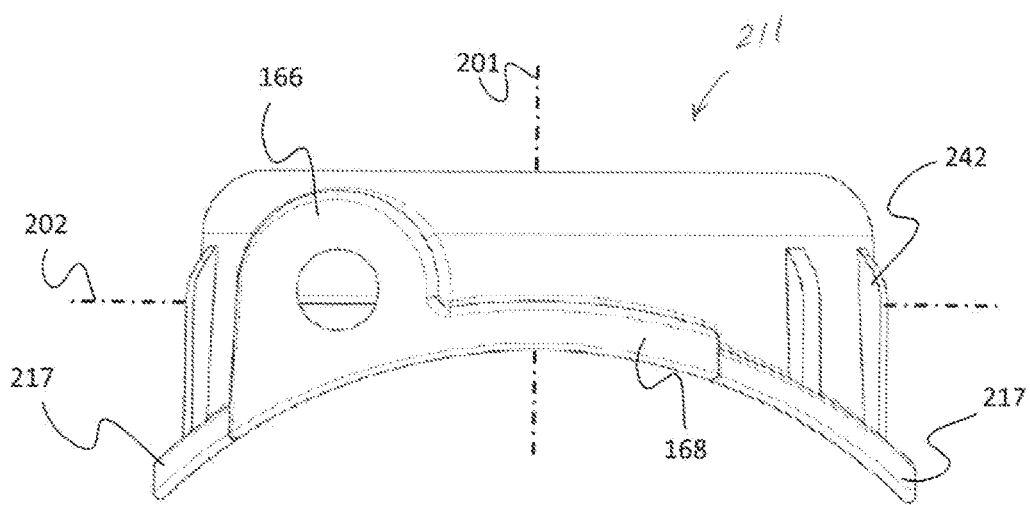
Figure 10D:
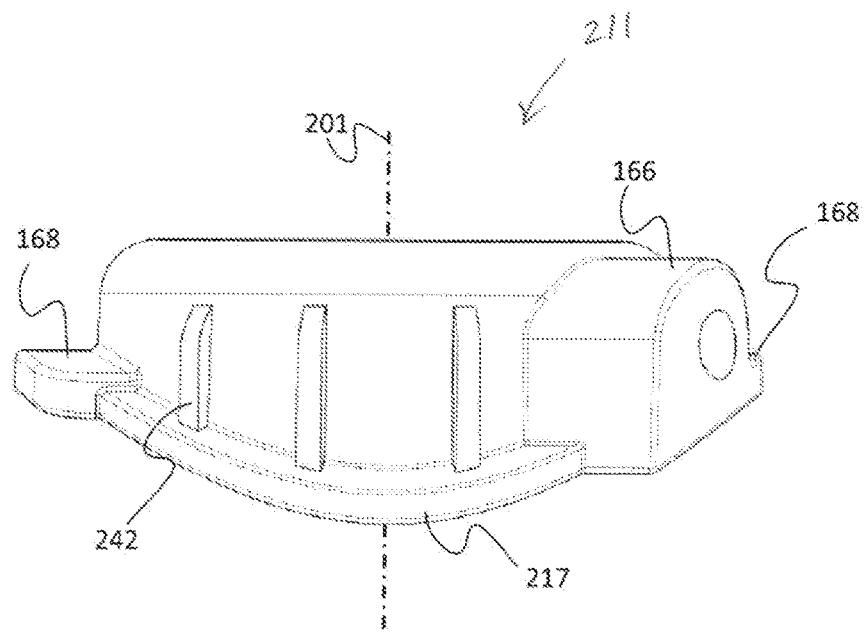
Figure 10E:
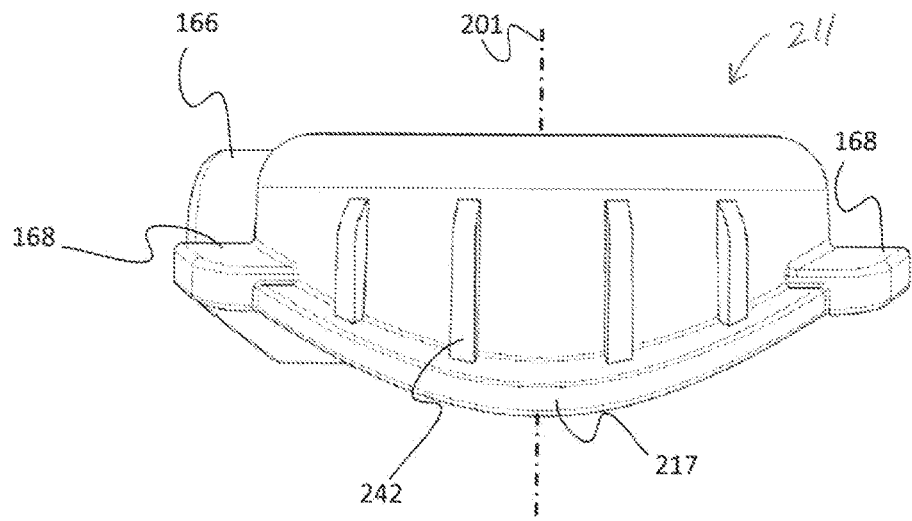

FIGS. 10A-10F are views of the collar 211 of the rigid protective housing 210. FIG. 10A is a perspective view of the collar 211. The collar 211 includes the opening 218, the cable receiving portion 166, the securing protrusions 168, and the extended sides 217. The collar 211 also includes ribs 242. The ribs 242 may be configured provide additional rigidity for the collar 211. In an embodiment, ribs 242 may not be included in the collar 211. The collar 211 also includes an interior 244. The interior 244 houses the control mechanism 220 of the control device 150. The interior 244 may include securing features such as the notch 246 for assembling and/or securing components of the control device (e.g. the control base 234) disposed on an interior surface 245 of the interior 244. The collar 211 may be made of any material rigid enough to protect a contained control mechanism 220 from unwanted actuation. For example, rigid materials such as polypropylene or glass filled polypropylene may be used.

Figure 10F:
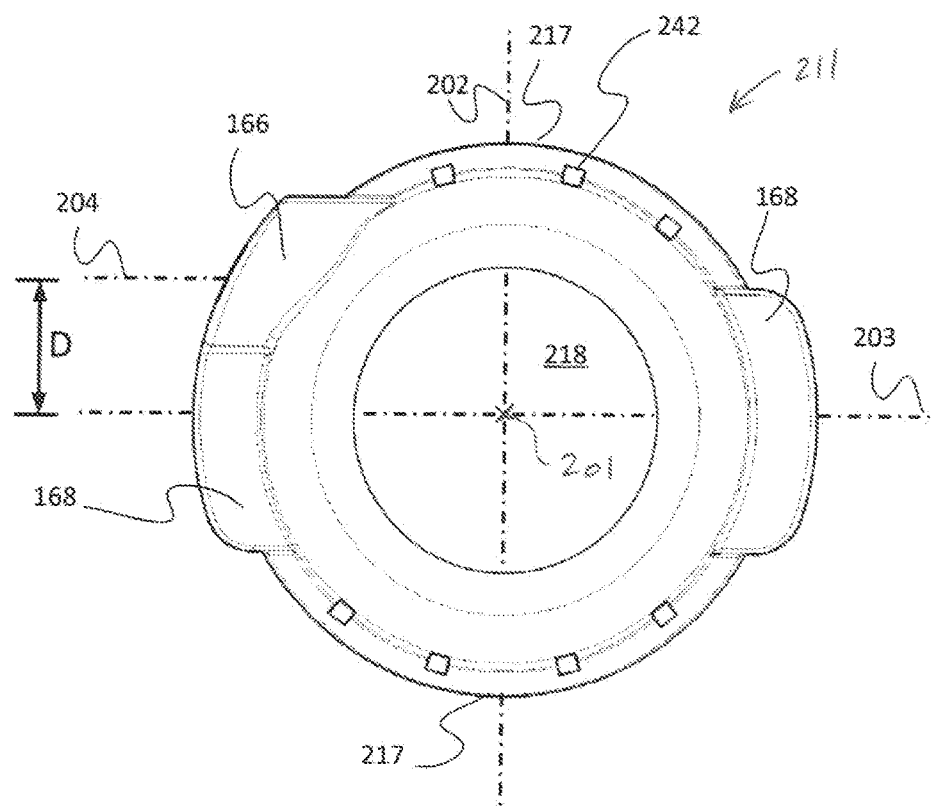

FIGS. 10B-10E show different side views of the collar 211. The actuation axis 201 as it would exist in an assembled control device 150 is indicated in the FIGS. 10B-10E. Also, the extended sides 217 are spaced apart from each other along a first axis 202 and the securing protrusions 168 are spaced apart from each other along a second axis 203. FIG. 10F is a top view of the protective housing 210. In FIG. 10F, it can be seen that the first axis 202 and the second axis 203 are orthogonal in this embodiment. In this embodiment, the extended sides 217 are configured to matingly engage around the circumference of a bicycle bar, such as a handlebar, and the securing protrusions 168 are configured to be aligned with a length dimension of the bicycle bar. In other embodiments, the securing protrusions 168 and the extended sides 217 may be disposed along axes that are parallel or at an angle between parallel and orthogonal. The control device 150 is secured to the bicycle bar by wrapping gripping tape 154 over the securing protrusions 168 and around the bicycle bar as shown in FIG. 2B. FIG. 10F is a top view of the collar 211, and further illustrates that the axis 203 also represents a centerline axis for the collar 211. A centerline 204 for the cable receiving portion 166 is offset a distance D from this centerline axis.

Figure 11A:
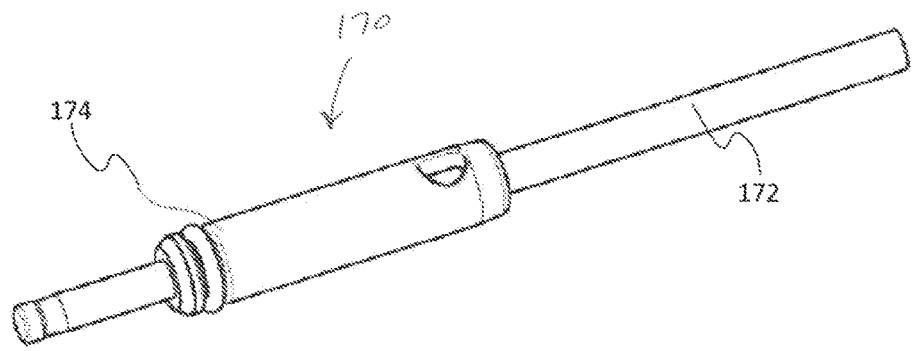
FIGS. 11A-11C are views of a cable assembly of the control device of FIG. 6.
Figure 11B:
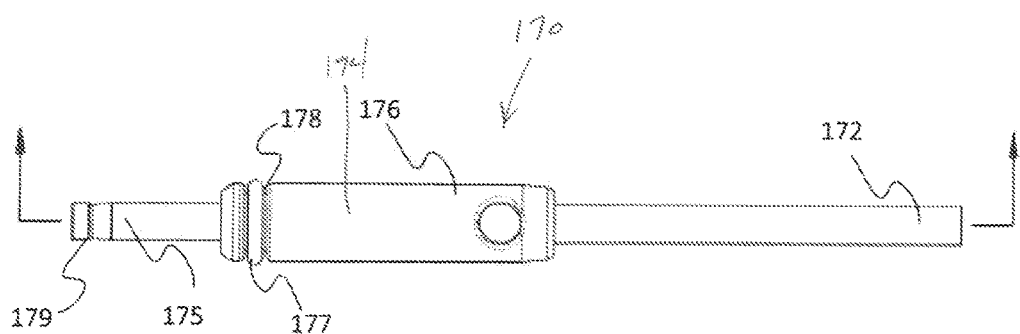
Figure 11C:
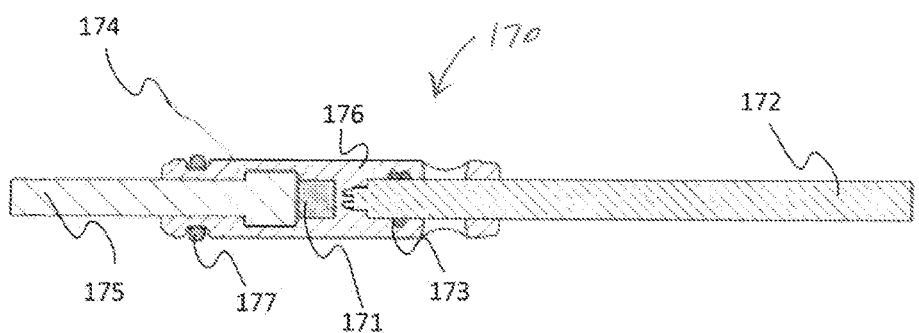

FIGS. 11A-11C are views of the cable assembly 170 of the control device 150 of FIG. 5. The cable assembly 170 includes the connector 174 and the cable 172. The connector 174 includes an insertable connective portion 175 and a connector casing 176. The connector 174 may include a scalable connection to a receiver 310 (see FIG. 13) that is to be communicably coupled with the control device 150 using the cable assembly 170. For example, an O-ring 177 may be used in conjunction with a sealing portion 178 of the connector casing 176. FIG. 11C is a sectional view of the cable assembly of FIG. 11B taken along line 11C-11C. In FIG. 11C, a hog ring 173 is used to aid in securing the cable 172 to the connector casing 176. Also, a communication junction 171 is shown that provides for the communicative connection between the cable 172 and the insertable connective portion 175. In an embodiment, the communication junction 171 involves a solder tab that is soldered to both the insertable connective portion 175 and the cable 172. The solder tab may be made of a conductive material, or combination of materials. For example, the solder tab may be made of nickel plated brass. The solder tab and solder connections may be contained in an insulator, such as silicone.

The cable 172 may be any cable construction operative to communicate control signals of the control device. In an embodiment, the cable 172 includes two conductive wires for communicating the control signals.

The connector casing 176 may be made of any material operable to insulatingly house a communicative connection between the cable 172 and the insertable connective portion 175. For example, the connector casing 176 may be made of a thermoplastic engineering polymer or polyesters, such as polybutylene terephthalate ("PBT") or glass filled PBT.

The insertable connective portion 175 may be made of different conductive materials so as to be operable to conduct communicative signals from the control device to a receiver to which the insertable connective portion 175 is inserted or otherwise coupled. For example, the insertable connective portion 175 may be made all or mostly of a conductive metal, such as steel, copper, or aluminum, as well as other metals or combinations thereof. The insertable connective portion 175 may have a tip 179 that is particularly dimensioned to be securely received by a corresponding port of a receiver. For example, the tip 179 may include a cuffed or recess region configured to be received by a spring loaded receptacle.

Figure 13:
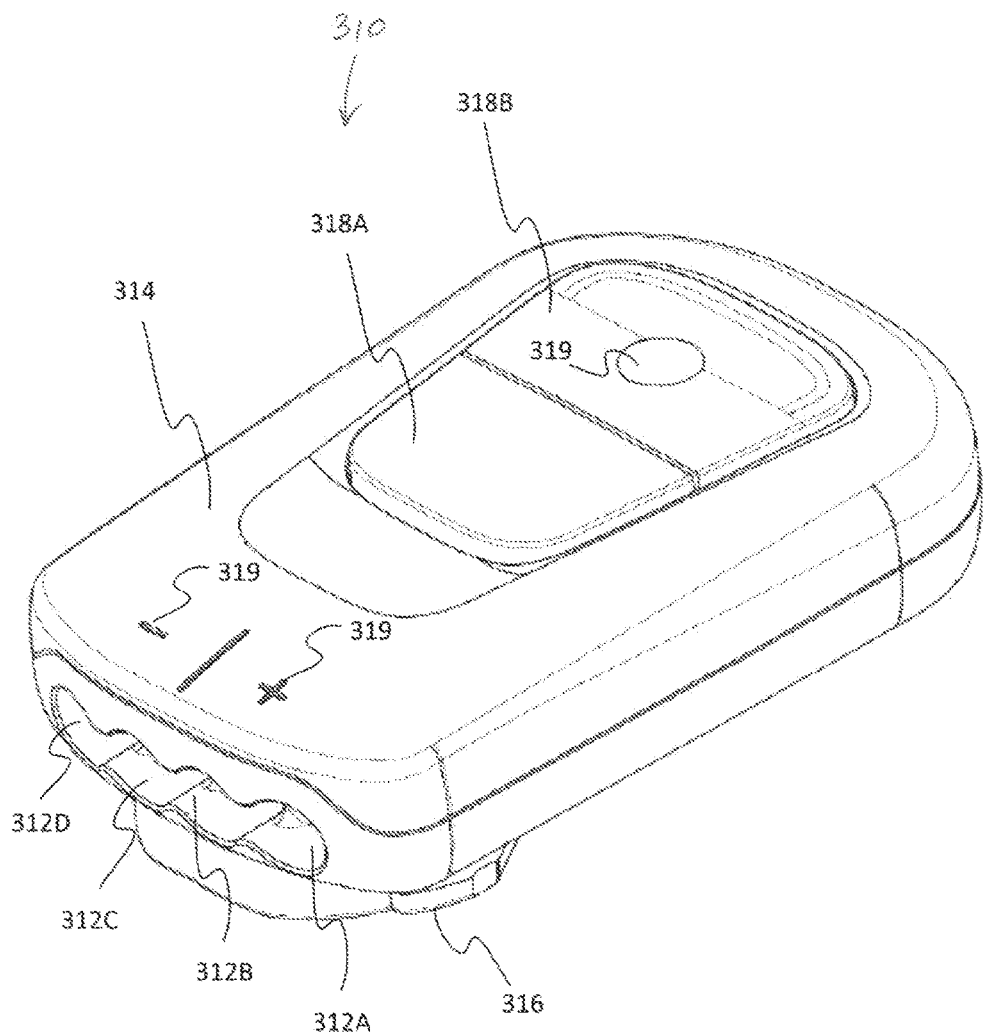
FIG. 13 is a perspective view of an embodiment of a receiver.

FIG. 13 is a perspective view of an embodiment of the receiver 310. The receiver 310 is configured to receive input signals from at least one control device 150 and communicate a control signal to at least one component of a bicycle. The receiver 310 has at least one port 312A-312D that is configured to receive cable connectors, such as the insertable connective portion 175 of the cable assembly 170 of FIGS. 11A-11C. In embodiments that include multiple ports 312A-312D, the receiver 310 may be configured to group the inputs to the ports 312A-312D. Input from control devices connected to one group of ports 312A-312B may indicate one action, whereas input from control devices 150 connected to another group of ports 312C-312D may indicate a different action. For example, input from any control device 150 connected to any port of a first group of ports 312A-312B may indicate a shift up action for a drive train component of a bicycle, such as a rear derailleur. Further, input from any control device connected to any port of a second group of ports 312C-312D may indicate a shift up action for the drive train component of the bicycle. Also, inputs from any control device attached to the first group of ports 312A-312B in combination with input from any control device attached to the second group of ports 312B-312C may indicate a third action. The third action may be directed to a second component of the bicycle, such as a front derailleur of the bicycle. For example, the second action may be a shift or toggle action for the front derailleur.

The receiver 310 also includes a case 314 and a mounting structure 316. The case 314 may be a rigid case, and made of a rigid material such as polypropylene or glass filled polypropylene. The case 310 may include markings 319 indicating port groupings, or actions associated therewith. For example, one group of ports may be marked with a "−" symbol to indicate a downshift action of a rear derailleur, whereas another set of ports may be marked with a "+" to indicate an up-shift action of the rear derailleur. The receiver 310 may also include interface buttons 318A-318B. The interface buttons 318A-318B may be configured to trigger actions by the receiver 310. These actions may include any action, such as initiating a wireless communication coupling sequence with one or more components of a bicycle, communicating control signals for adjusting geometric shifting positions of a front and/or rear derailleur, toggling a front derailleur, or other actions. The interface buttons 318A-318B may also be configured so as to have different actuation points for different actions. For example, one or more of the interface buttons 318B may include a distinguishing feature 319, such as a dimple, that is detectible by touch. The distinguishing feature 319 may indicate that a specific action, such as communicating a control signal for a front derailleur toggle, is triggered when pressed on the feature 319. Other actions may be associated with pressing to the left or right of the feature 319. In an embodiment, control signals indicating micro-adjustments to the position of the rear derailleur may be triggered by pressing the button 318B either to the right or left of the feature 319. For example, a micro-adjustment moving the rear derailleur towards the rear wheel may be triggered by touching to the left of the feature 319, whereas a micro-adjustment moving the rear derailleur away from the rear wheel may be triggered by touching to the right of the feature 319. The receiver 310 may include additional components as well. For example, the receiver may include an actuator indication light, a processor, a memory, a power supply, and/or a communication interface, as well as other components.

Figure 14:
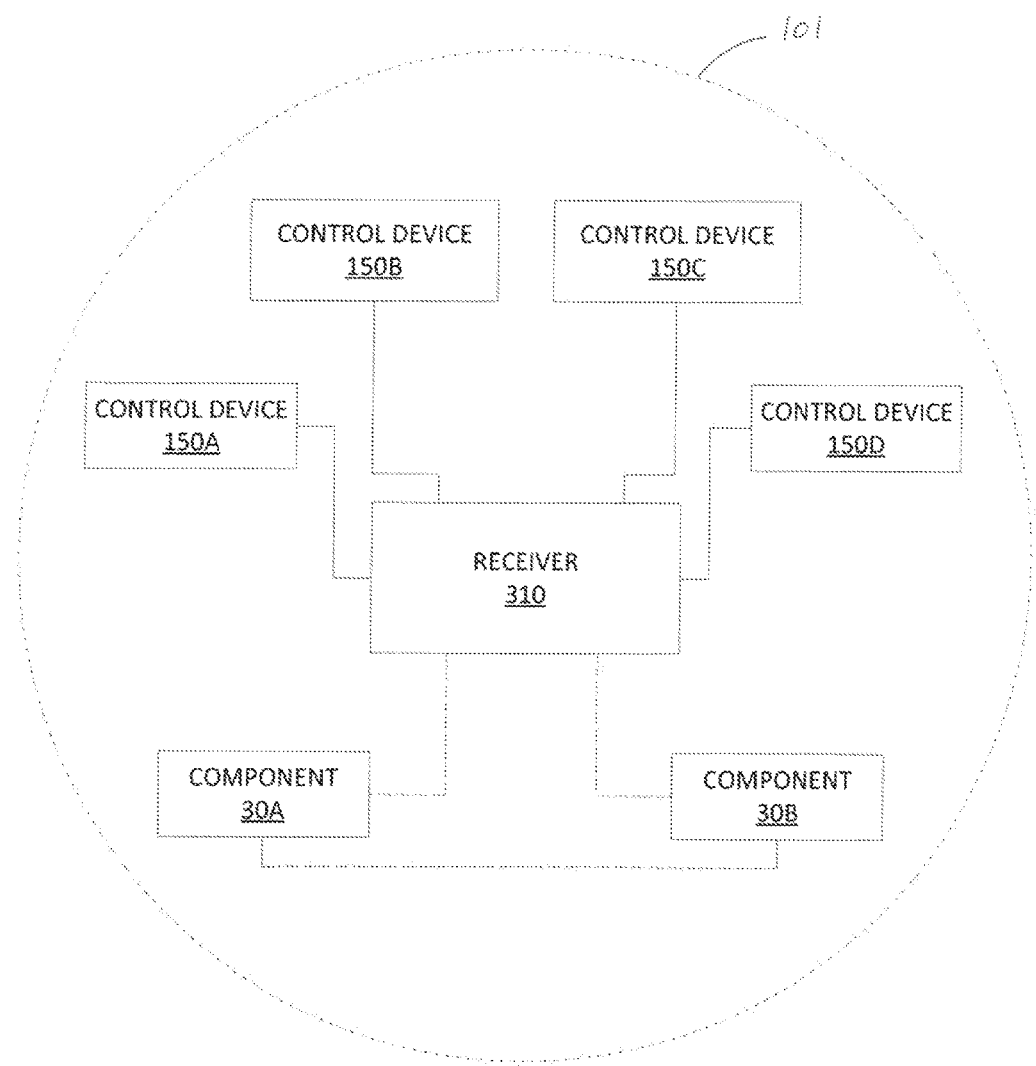
FIG. 14 is a block diagram of a bicycle control system according to one embodiment.

FIG. 14 illustrates a bicycle control system 101 that includes multiple control devices 150A-150D, a receiver 310, and bicycle components 30A-30B. The control devices 150A-150D are communicatively coupled with the receiver 310, such as by a cable, to communicate control signals to the receiver 310. The receiver 310 is configured to communicate control signals responsive to the received control device signals. The receiver is configured to communicate the control signals wirelessly to one or multiple bicycle components 30A-30B. The control signals may be communicated wirelessly using any technique, protocol, or standard. For example, Institute of Electrical and Electronics Engineers ("IEEE") 802.11 standards. IEEE 802.15.1 or BLUETOOTH® standards, and/or ANT™ or ANT+™ standards may be used. The bicycle components 30A-30B may be any bicycle component. For example, the components 30A-30B may be a drive train components and/or suspension components. In an embodiment, a component 30A may be a rear derailleur and the other component 30B may be a front derailleur. Other components may also be included. For example, the receiver 310 may be in communication with, or provide control signals for, three (3) or more components, such as a front derailleur, a rear derailleur, and a front suspension system. Alternatively, the receiver 310 may only provide control signals for a single component 30A. In an embodiment, the receiver may communicate control signals wirelessly with one component 30A, and that component 30A may communicate the control signals to another component 30B.

In an embodiment, a bicycle control system 101 includes at least one control device 150 including a control mechanism 220 for generating a control signal to control at least one bicycle component 30A. The control device 150 also may include a rigid protective housing 210 configured to surround the control mechanism, the rigid protective housing 210 having an opening 218. The control device 150 may also include a cover 169 extending across the opening 218, the cover 169 configured to displace into the opening 218 to engage the control mechanism 220. The bicycle control system 101 may also include a receiver 310 communicably coupled to the at least one control device 150 by at least one cable 170. The at least one control device 150 may be configured to communicate the control signal to the receiver 310 when the control mechanism 220 is engaged. Also, the receiver 310 may be configured to wirelessly communicate the action to the at least one bicycle component 30A. The at least one control device 150 may be a plurality of control devices 150A-150C. The receiver 310 may be further configured to interpret individual control signals from any of a first set of control devices 150A-150B of the plurality of control devices as a first indicated action, and interpret individual signals from any of a second set of control devices 150C-150D of the plurality of control devices as a second indicated action. The receiver 310 may also, or alternatively, be configured to interpret a combination of signals from a control device of the first of control devices 150A-150B and a control device of the second set of control devices 150C-150D as a third indicated action. The receiver 310 may be configured to communicate the first action and the second action to a first component 30A of the bicycle, and communicate the third action to a second component 30B of the bicycle. For example, the first, component 30A of the bicycle is a rear derailleur, the first action is a shift-up action of the rear derailleur, and the second action is a shift-down action of the rear derailleur.

Figure 15:
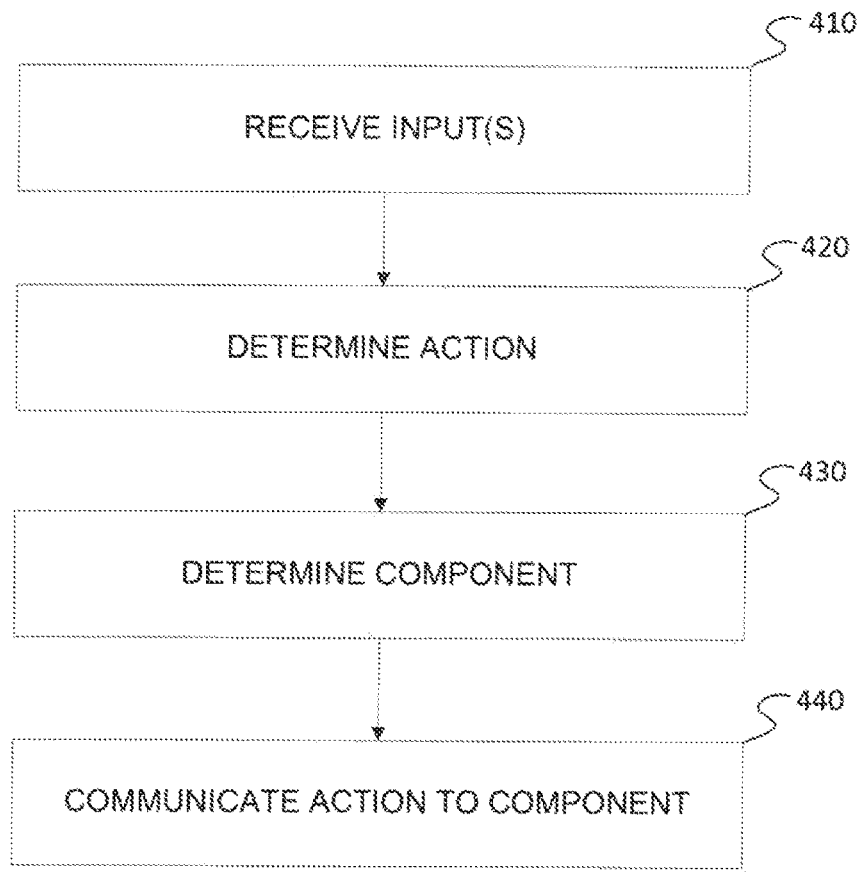
FIG. 15 is a flow chart of an example embodiment for a method of controlling a bicycle.

FIG. 15 illustrates a flow chart of an example embodiment for a method of controlling a bicycle. As presented in the following sections, the acts may be performed using any combination of the components indicated in FIG. 16. For example the following acts may be performed by a receiver 310. Additional, different, or fewer acts may be provided. The acts are performed in the order shown or other orders. For example act 420 and act 430 may be performed concurrently. The acts may also be repeated.

In act 410 one or more inputs are received. The one or more inputs are from one or more control devices mounted at different, locations of a bicycle. The input may be any input, for example, the input may be a signal such as an electrical impulse initiated at a control device and communicated through a cable to a receiver. The input may be a single input from a singular control device, or multiple concurrent inputs from multiple control devices may be received.

In act 420, an action associated with the input, or combination of inputs, is determined. The action may be any action of a component of a bicycle. For example the action may be a shift action, such as a shift-up, shift down, or toggle action for a drive train component of the bicycle. The action is determined based on the particular control device, or devices, providing the input. For example, impulses or signals from particular control devices, or combinations thereof, indicate a particular action. As such, impulses or signals from particular control devices, or combinations thereof, determine the action. Further, in act 430, a bicycle component for the action is determined. Impulses or signals from particular control devices, or combinations thereof may also indicate a particular bicycle component for the action. For example, particular control devices may be connected to particular ports, each of the particular ports being associated with actions and/or components for the action. Inputs on a particular port, or a combination of ports, from the control devices will indicate an action and a component for the action.

In act 440, the determined action is communicated to the determined component. The action is communicated wirelessly to the component, for example using the component communication interface 80 described below with respect to FIG. 16.

In an embodiment, receiving individual control signals from any of a first set of control devices are determined to indicate a first action, and receiving control signals from any of a second set of control devices is determined to indicate a second action. Also, receiving a combination of signals from a device of the first set of control devices and a device of the second set of control devices is determined to indicate a third action. The first action and the second action may be determined to be for a first component of the bicycle, based on the control device providing the signal and/or the action determined from the signal. The third action may be communicated to a second component of the bicycle based on the combination of control devices providing the signals and/or the action determined from the signals. In an example, the first component of the bicycle is a rear derailleur, the first action is a shift-up action of the rear derailleur, and the second action is a shift-down action of the rear derailleur. In this example, the second component is a front derailleur and the third action is a shift action of the front derailleur, which may be a toggle between two available sprockets in a front or driving chainring set.

Figure 16:
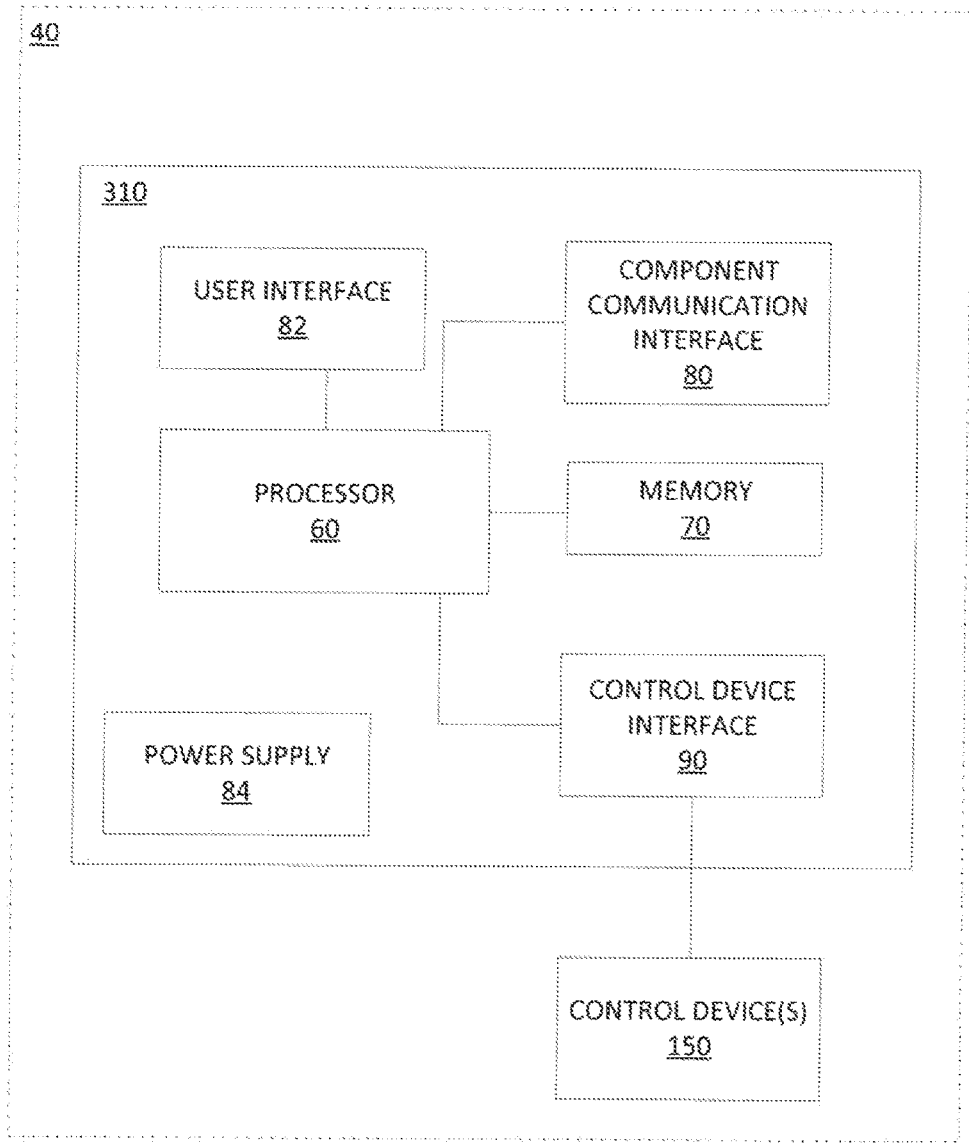
FIG. 16 is a block diagram of an exemplary remote and/or alternative control system for a bicycle.

FIG. 16 is a block diagram of an exemplary remote and/or alternative control system 40 for a bicycle. The remote control system 40 may be used alone to communicate with and control bicycle components, or the remote control system 40 may be used in conjunction with at least one other control system for components of the bicycle, such as a primary control system that may include alternative control devices such as brake lever housing integrated shift controllers. The system 40 includes a receiver 310 and one or more control devices 150. The receiver 310 includes a processor 60, a memory 70, component communication interface 80, a user interface 82, a power supply 84, and a control device interface 90. Additional, different, or fewer components are possible for the receiver 310.

The processor 60 may include a general processor, digital signal processor, an application specific integrated circuit (ASIC), field programmable gate array (FPGA), analog circuit, digital circuit, combinations thereof, or other now known or later developed processor. The processor 60 may be a single device or combinations of devices, such as through shared or parallel processing.

The memory 70 may be a volatile memory or a non-volatile memory. The memory 70 may include one or more of a read only memory (ROM), random access memory (RAM), a flash memory, an electronic erasable program read only memory (EEPROM), or other type of memory. The memory 70 may be removable from the receiver 310, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 70 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply, which may be stored internal to the receiver 310, or stored external to the receiver 310 and communicated to the receiver 310 through a power conductive cable. The power supply may involve the generation of electric power, for example using a mechanical power generator, a fuel cell device, photovoltaic cells, or other power generating devices. The power supply may include a battery such as a device consisting of two or more electrochemical cells that convert stored chemical energy into electrical energy. The power supply 84 may include a combination of multiple batteries or other power providing devices. Specially fitted or configured battery types, or standard battery types such as CR 2012, CR 2016, and/or CR 2032 may be used.

The control device interface 90 provides for data communication from the control devices 150 to the receiver 310. The control device interface 90 includes wired conductive signal and/or data communication circuitry operable to interpret signals provided by different control devices 150. For example, the control device interface 90 may include a series of ports for receiving control device input cables. Each of the ports may be distinguishable by the processor 60 through grouping tables or arrays, or through physical circuits or other circuitry that provide for grouping control device inputs.

The user interface 82 may be one or more buttons, keypad, keyboard, mouse, stylus pen, trackball, rocker switch, touch pad, voice recognition circuit, or other device or component for communicating data between a user and the receiver 310. The user interface 82 may be a touch screen, which may be capacitive or resistive. The user interface 82 may include a liquid crystal display ("LCD") panel, light emitting diode (LED), LED screen, thin film transistor screen, or another type of display. The user interface 82 may also include audio capabilities, or speakers.

In an embodiment, the user interface 82 includes multiple buttons and an LED indicator. The multiple buttons are used to communicate commands to the receiver 310, and the LED indicator lights to indicate input of the commands.

The component communication interface 80 is configured to send data such as control signals and/or commands to bicycle components. The component communication interface 80 communicates the data using any operable connection. An operable connection may be one in which signals, physical communications, and/or logical communications may be sent and/or received. An operable connection may include a physical interface, an electrical interface, and/or a data interface. The component communication interface 80 provides for wireless communications in any now known or later developed format. Although the present specification describes components and functions that may be implemented in particular embodiments with reference to particular standards and protocols, the invention is not limited, to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, the methods described herein may be implemented with software programs executable by a computer system, such as the receiver 310. Further, in an exemplary, non-limited embodiment, implementations can include distributed processing, component/object, distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a receiver 310 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD- ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, bat rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed, as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product, or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited hi each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electrical control device for a bicycle comprising:
   a control mechanism for generating a control signal to control a bicycle component;
   a rigid protective housing configured to surround the control mechanism, the rigid protective housing having an opening and configured to protect against actuation of the control mechanism from forces distributed across the region of the opening in a transverse direction relative to a plane that contains the opening of the rigid protective housing; and
   a cover extending across the opening, the cover configured to displace into the opening to engage the control mechanism to generate the control signal.

2. The control device of claim 1, wherein the cover further comprises a flexible actuation surface configured to deform into the opening when depressed.

3. The control device of claim 2, wherein the cover further comprises a rigid protrusion on an underside of the flexible actuation surface that is configured to engage the control mechanism to generate the control signal.

4. The control device of claim 1, wherein the cover further covers at least a portion of the rigid protective housing.

5. The control device of claim 1, wherein the cover forms a seal with the rigid protective housing around the control mechanism.

6. The control device of claim 1, wherein a height of the control mechanism along an actuation axis is less than a minimum height of the rigid protective housing along the actuation axis.

7. The control device of claim 1, wherein the opening is disposed along an actuation axis above the control mechanism.

8. The control device of claim 1, wherein the control device is configured to generate and communicate the control signal to a receiver when the control mechanism is engaged.

9. The control device of claim 8, further comprising a cable assembly configured to communicate the signal to the receiver.

10. The control device of claim 1, wherein the rigid protective housing further comprises a cable receiving portion.

11. The control device of claim 10, wherein the cable receiving portion is offset from a centerline of the rigid protective housing.

12. The control device of claim 1, wherein the rigid protective housing further comprises securing features for securing the control device to the bicycle.

13. The control device of claim 12, wherein the rigid protective housing further comprises extended sides to provide a mating surface contoured to matingly engage a mounting surface of the bicycle.

14. The control device of claim 13, wherein the extended sides are spaced apart from each other along a first axis, and the securing features are spaced apart from each other along a second axis, the first axis different than the second axis.

15. The control device of claim 14, wherein the first axis is orthogonal to the second axis.

16. The control device of claim 1, further comprising a mating surface defined by a curve having a diameter, and a height defined by a minimum distance from an apex of the curve of the mating surface to a top of the control device, and wherein an aspect ratio of the height to the diameter for the device is 0.25 or less.

17. The control device of claim 1, wherein the control mechanism is epoxy sealed in the control device.

18. A control device assembly for a bicycle comprising:
a control device including:
  a control mechanism for generating a control signal to control a bicycle component,
  a rigid protective housing configured to surround the control mechanism, the rigid protective housing having an opening and configured to protect against actuation of the control mechanism from forces distributed across the region of the opening in a transverse direction relative to a plane that contains the opening of the rigid protective housing,
  a cover extending across the opening, the cover configured to displace into the opening to engage the control mechanism to generate the control signal, and
  securing features; and
a coupler configured to be attached to a bar end of a bicycle handlebar, the coupler having a gripping surface and a control device securing part dimensioned to receive the securing features of the control device.

19. The control assembly of claim 18, wherein the cover has a flexible actuation surface configured to engage the control mechanism when depressed.

20. The control assembly of claim 18, wherein the coupler is configured to fit over the bar end of the bicycle handlebar.

21. A bicycle control system comprising:
at least one electrical control device comprising a control mechanism for generating a control signal to control at least one bicycle component, a rigid protective housing configured to surround the control mechanism, the rigid protective housing having an opening and configured to protect against actuation of the control mechanism from forces distributed across the region of the opening in a transverse direction relative to a plane that contains the opening of the rigid protective housing, and a cover extending across the opening, the cover configured to displace into the opening to engage the control mechanism to generate the control signal; and
a receiver communicably coupled to the at least one control device by at least one cable,
wherein the at least one control device is configured to communicate the control signal to the receiver when the control mechanism is engaged, and wherein the receiver is configured to wirelessly communicate an action to the at least one bicycle component based on the control signal.

22. The bicycle control system of claim 21, wherein the at least one control device comprises a plurality of control devices.

23. The bicycle control system of claim 22, wherein the receiver is further configured to interpret individual control signals from any of a first set of control devices of the plurality of control devices as a first indicated action, and interpret individual signals from any of a second set of control devices of the plurality of control devices as a second indicated action.

24. The bicycle control system of claim 23, wherein the receiver is further configured to interpret a combination of signals from the first of control devices and the second set of control devices as a third indicated action.

25. The bicycle control system of claim 24, wherein the receiver is configured to communicate the first action and the second action to a first component of the bicycle, and communicate the third action to a second component of the bicycle.

26. The bicycle control system of claim 25, wherein the first component of the bicycle is a rear derailleur, the first action is a shift-up action of the rear derailleur, and the second action is a shift-down action of the rear derailleur.

27. The bicycle control system of claim 26, wherein the second component is a front derailleur and the third action is a shift action of the front derailleur.

* * * * *